(12) United States Patent
Meyer et al.

(10) Patent No.: US 12,182,695 B1
(45) Date of Patent: *Dec. 31, 2024

(54) FINE-GRAINED SPARSITY COMPUTATIONS IN SYSTOLIC ARRAY

(71) Applicant: Amazon Technologies, Inc., Seattle, WA (US)

(72) Inventors: Paul Gilbert Meyer, Jericho, VT (US); Thiam Khean Hah, San Jose, CA (US); Randy Renfu Huang, Morgan Hill, CA (US); Ron Diamant, Santa Clara, CA (US); Vignesh Vivekraja, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,129

(22) Filed: Sep. 25, 2023

Related U.S. Application Data

(63) Continuation of application No. 16/917,015, filed on Jun. 30, 2020, now Pat. No. 11,803,736.

(51) Int. Cl.
*G06F 17/16* (2006.01)
*G06F 7/544* (2006.01)
*G06F 9/38* (2018.01)
*G06N 3/063* (2023.01)

(52) U.S. Cl.
CPC ........... *G06N 3/063* (2013.01); *G06F 7/5443* (2013.01); *G06F 9/3893* (2013.01); *G06F 17/16* (2013.01); *G06F 2207/4824* (2013.01)

(58) Field of Classification Search
CPC ....... G06N 3/063; G06F 9/3893; G06F 17/16; G06F 2207/4824
See application file for complete search history.

(56) References Cited

U.S. PATENT DOCUMENTS

| 5,216,751 A | 6/1993 | Gardner et al. |
| 11,003,985 B2 | 5/2021 | Kim et al. |
| 11,126,690 B2 | 9/2021 | Azizi |
| 11,194,549 B2 | 12/2021 | Liu et al. |
| 11,379,556 B2 | 7/2022 | Mattina et al. |
| 11,500,962 B1 | 11/2022 | Meyer et al. |
| 11,625,453 B1 | 4/2023 | Meyer et al. |
| 11,709,783 B1 | 7/2023 | Chen et al. |
| 11,803,736 B1 | 10/2023 | Meyer et al. |
| 2018/0336165 A1 | 11/2018 | Phelps et al. |

(Continued)

OTHER PUBLICATIONS

U.S. Notice of Allowance dated Jul. 14, 2022, in U.S. Appl. No. 16/917,033.

(Continued)

*Primary Examiner* — Matthew D Sandifer
(74) *Attorney, Agent, or Firm* — Weaver Austin Villeneuve & Sampson LLP

(57) ABSTRACT

A systolic array can implement an architecture tailored to perform matrix multiplications on sparse matrices. Each processing element in the systolic array may include a register configured to store a value, and a multiplexor configured to select an input element from multiple input data buses based on metadata associated with the value. Each processing element may also include a multiplier configured to multiply the selected input element with the value to generate a multiplication result, and an adder configured to add the multiplication result to a partial sum input to generate a partial sum output.

20 Claims, 13 Drawing Sheets

(56) References Cited

U.S. PATENT DOCUMENTS

| | | |
|---|---|---|
| 2018/0349290 A1 | 12/2018 | Staudenmaier et al. |
| 2019/0114538 A1 | 4/2019 | Ng et al. |
| 2019/0156201 A1 | 5/2019 | Bichler et al. |
| 2019/0236049 A1 | 8/2019 | Vantrease et al. |
| 2019/0244086 A1 | 8/2019 | Franca-Neto |
| 2019/0244106 A1 | 8/2019 | Franca-Neto |
| 2019/0311243 A1 | 10/2019 | Whatmough et al. |
| 2019/0362235 A1 | 11/2019 | Xu et al. |
| 2019/0392300 A1 | 12/2019 | Weber et al. |
| 2020/0097834 A1 | 3/2020 | Liu et al. |
| 2020/0104669 A1 | 4/2020 | Chole et al. |
| 2020/0143249 A1 | 5/2020 | Georgiadis |
| 2020/0150598 A1 | 5/2020 | Kim et al. |
| 2020/0226201 A1 | 7/2020 | Ma et al. |
| 2020/0228137 A1 | 7/2020 | Chinya et al. |
| 2021/0042617 A1 | 2/2021 | Chinya et al. |
| 2021/0159912 A1 | 5/2021 | Wang et al. |
| 2021/0295168 A1 | 9/2021 | Xu et al. |

OTHER PUBLICATIONS

U.S. Non-Final Office Action dated Mar. 29, 2022, in U.S. Appl. No. 16/917,033.

U.S. Non-Final Office Action dated Jan. 17, 2023, in U.S. Appl. No. 16/917,015.

U.S. Notice of Allowance dated Jun. 28, 2023, in U.S. Appl. No. 16/917,015.

U.S. Appl. No. 18/052,527, inventors Meyer et al., filed Nov. 3, 2022.

Blalock, D., et al. "What is the State of Neural Network Pruning?" Proc. of the 3rd Machine Learning and Systems (MLSys) Conference, 2020, pp. 1-18, URL: https://proceedings.mlsys.org/paper/2020/file/d2ddea18f00665ce8623e36bd4e3c7c5-Paper.pdf.

Brownlee, J., "A Gentle Introduction to Sparse Matrices for Machine Learning," Machine Learning Mastery, Mar. 13, 2018 (updated Aug. 9, 2019), pp. 1-14, URL: https://machinelearningmastery.com/sparse-matrices-for-machine-learning/.

Busato, F., et al. "Exploiting NVIDIA Ampere Structured Sparsity with cuSPARSELt," NVIDIA Technical Blog, Dec. 8, 2020, pp. 1-8, URL: https://developer.nvidia.com/blog/exploiting-ampere-structured-sparsity-with-cusparselt/.

Li, Z., et al., "The Lazy Neuron Phenomenon: On Emergence of Activation Sparsity in Transformers," arXiv:2210.06313v2 [cs.LG], Jun. 2023, pp. 1-35, URL: https://arxiv.org/abs/2210.06313v2.

Liu, Z., et al., "Sparse Systolic Tensor Array for Efficient CNN Hardware Acceleration," arxiv:2009.02381v2 [cs.AR], Oct. 12, 2020, pp. 1-13, URL: https://arxiv.org/abs/2009.02381v2.

Lu, W., et al., "FlexFlow: A Flexible Dataflow Accelerator Architecture for Convolutional Neural Networks," 2017 IEEE International Symposium on High Performance Computer Architecture (HPCA), 2017, pp. 553-564.

Pool, J., "Accelerating Sparsity in the NVIDIA Ampere Architecture," NVIDIA GTC 2020: GPU Technology Conference, S22085, Mar. 2020, 71 pages.

Pool, J., et al., "Accelerating Inference with Sparsity Using the NVIDIA Ampere Architecture and NVIDIA TensorRT," NVIDIA Technical Blog, Jul. 20, 2021, 5 pages, URL: https://developer.nvidia.com/blog/accelerating-inference-with-sparsity-using-ampere-and-tensorrt/.

See, A., et al., "Compression of Neural Machine Translation Models via Pruning," Proc. of the 20th SIGNLL Conference on Computational Natural Language Learning (CoNLL), 2016, pp. 291-301.

U.S. Non-Final Office Action dated Feb. 23, 2024 in U.S. Appl. No. 18/052,527.

U.S. Notice of Allowance dated Jun. 13, 2024 in U.S. Appl. No. 18/052,527.

U.S. Appl. No. 16/712,836, inventors Meyer et al., filed Dec. 12, 2019.

U.S. Appl. No. 18/194,055, inventors Tan X, et al., filed Mar. 31, 2023.

U.S. Appl. No. 18/194,072, inventors Tan X, et al., filed Mar. 31, 2023.

U.S. Appl. No. 18/435,566, inventors Romaszkan W, et al., filed Feb. 7, 2024.

U.S. Appl. No. 18/435,571, inventors Romaszkan W, et al., filed Feb. 7, 2024.

U.S. Appl. No. 18/509,272, inventors Meyer P G, et al., filed Nov. 14, 2023.

U.S. Appl. No. 18/509,274, inventors Meyer P G, et al., filed Nov. 14, 2023.

U.S. Appl. No. 18/509,275, inventors Meyer P G, et al., filed Nov. 14, 2023.

U.S. Appl. No. 18/509,278, inventors Meyer P G, et al., filed Nov. 14, 2023.

U.S. Appl. No. 18/509,282, inventors Meyer P G, et al., filed Nov. 14, 2023.

U.S. Appl. No. 18/511,722, inventors Meyer P G, et al., filed Nov. 16, 2023.

U.S. Appl. No. 18/192,092, inventors Meyer et al., filed Mar. 29, 2023.

Wang, M., et al., "Balancing memory-accessing and computing over sparse DNN accelerator via efficient data packaging," Journal of Systems Architecture, vol. 117, 2021, 102094, 11 pages. DOI: 10.1016/J.SYSARC.2021.102094.

Zhang, Z., et al., "MoEfication: Transformer Feed-forward Layers are Mixtures of Experts," Findings of the Association for Computational Linguistics: ACL 2022, May 2022, pp. 877-890.

900

```
┌─────────────────────────────────────────────────┐
│ Load non-zero weight values of a fine-grained   │
│ sparse weight matrix into a row of the array of │
│ processing elements.                            │
│                    902                          │
└─────────────────────────────────────────────────┘
                        │
                        ▼
┌─────────────────────────────────────────────────┐
│ Perform a sparse matrix multiplication          │
│ operation on the fine-grained sparse weight     │
│ matrix in a sparsity mode of operation using    │
│ the row of the array of processing elements.    │
│                    904                          │
└─────────────────────────────────────────────────┘
                        │
                        ▼
┌─────────────────────────────────────────────────┐
│ Load weight values of a weight matrix into      │
│ multiple rows of the array of processing        │
│ elements.                                       │
│                    906                          │
└─────────────────────────────────────────────────┘
                        │
                        ▼
┌─────────────────────────────────────────────────┐
│ Perform a matrix multiplication operation on    │
│ the weight matrix using the multiple rows of    │
│ processing elements in the normal mode of       │
│ operation.                                      │
│                    908                          │
└─────────────────────────────────────────────────┘
```

FIG. 9

FINE-GRAINED SPARSITY COMPUTATIONS IN SYSTOLIC ARRAY

CROSS-REFERENCE TO RELATED APPLICATIONS

This application is a continuation of U.S. patent application Ser. No. 16/917,015, filed Jun. 30, 2020, issued as U.S. Pat. No. 11,803,736 on Oct. 31, 2023, and titled "FINE-GRAINED SPARSITY COMPUTATIONS IN SYSTOLIC ARRAY," the content of which is incorporated herein by reference in its entirety.

BACKGROUND

Artificial neural networks utilize a computational model with an architecture based on biological neural networks. An artificial neural network can perform computations using a set of weights. Through these computations, the weights are combined with input data (which can also be referred to as feature maps) to perform an inference operation. For example, for a computer vision application to detect an object, the artificial neural network can combine the weights with an input image to extract certain features of the object from the image. Based on the extracted features, the artificial neural network can generate a decision of whether the object is in the image. Artificial neural networks can be trained, using training data in a training operation, to learn about how to perform the inference operation for an application.

An artificial neural network can perform computations on data in the form of matrices to execute the training and inference operations. For example, input data and weights can be organized into matrices. The artificial neural network can perform various matrix computations (e.g., dot-product matrix multiplications) between the input data and weight matrices at each neural network layer for a computing task. The data and weights matrices can also be pre-processed to support the matrix computations.

BRIEF DESCRIPTION OF THE DRAWINGS

Various embodiments in accordance with the present disclosure will be described with reference to the drawings, in which:

FIG. 9 illustrates a flow diagram of an example of a process to operate an array of processing elements;

DETAILED DESCRIPTION

Figure 1:
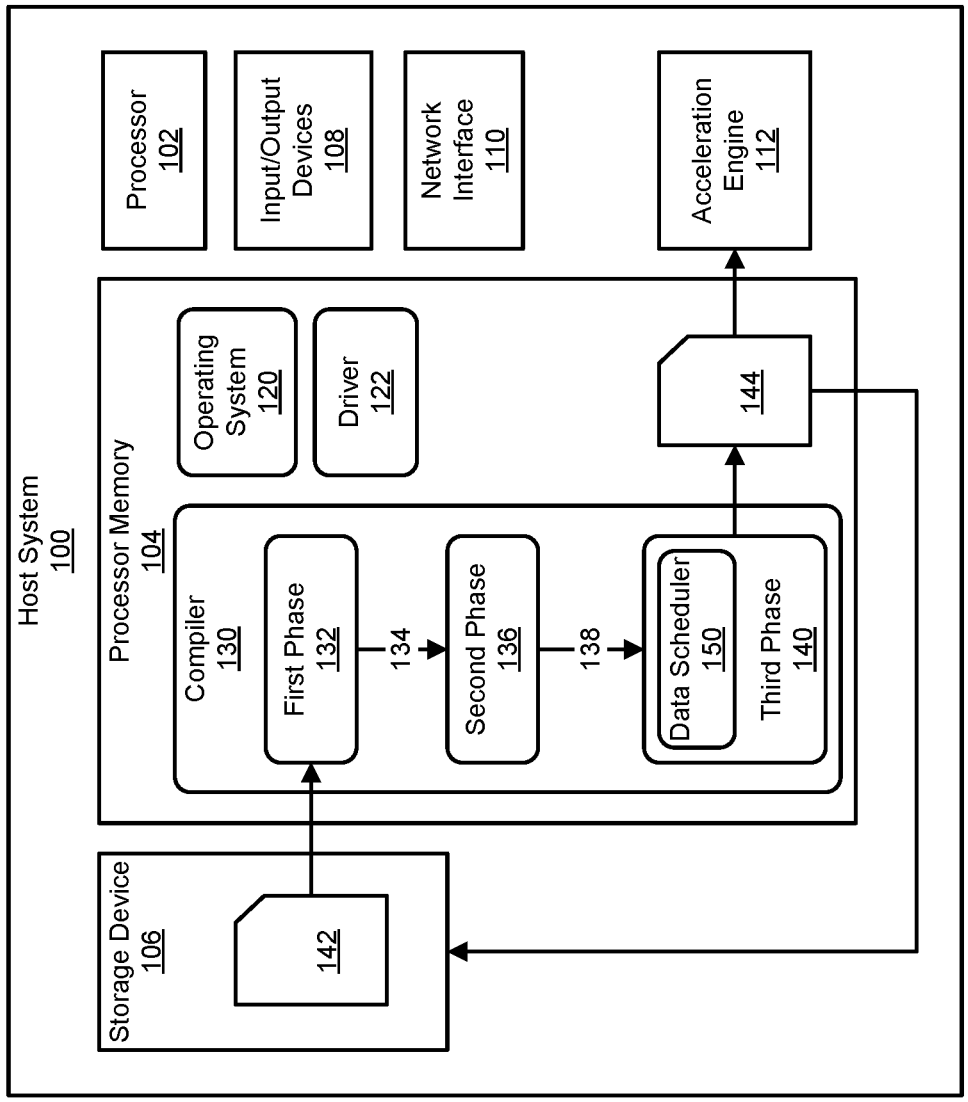
FIG. 1 illustrates a block diagram of an example of a system that includes a compiler.

Although neural networks can be executed on off-the-shelf processors, special-purpose accelerators can be designed to execute neural networks at a significantly higher efficiency than such general purpose processors. The special-purpose accelerators (which may be referred to as neural network processors or acceleration circuits) can have unique hardware features that allow the most-encountered operations of a neural network to be performed seamlessly with other operations of the neural network. For example, a neural network processor may include dedicated circuitry to perform matrix multiplication operations, which are often used in neural networks. Such dedicated circuitry can be implemented using an array of processing elements (which may be referred to as a systolic array), where each processing element (PE) contains circuitry to perform multiplication and accumulation operations to implement a matrix multiplication computation.

In a systolic array, two types of information may flow into each row of the array: feature map (FMAP) input elements and weight values. The weight values may flow into the array before the actual matrix multiply computation, and are stored in the processing elements (PEs) of the array. The FMAP input elements may flow in during the matrix multiply computation, and are multiplied in each PE by the previously stored weight value for that PE. The multiplication results are accumulated for each column of the array. The weight values for the next matrix multiplication can be loaded in the background while the current computation is occurring with the previously loaded weights.

While a systolic array can provide much faster performance than off-the-shelf processors when performing matrix multiplication computations, there can be instances where the systolic array may not be operating at full efficiency. For example, when the matrix multiplication is being performed on a sparse weight matrix (e.g., a weight matrix having both zero and non-zero values), a number of processing elements may be performing a multiplication and accumulation with a zero value. The computations performed by theses processing elements loaded with a zero weight value do not contribute to and do not affect the computation results. As such, computations performed on sparse weight matrices can lead to wasted computational capacity in the systolic array and unnecessary power consumption. Storing such sparse weight matrices in memory can also unnecessarily use up storage space for the zero values. For example, each zero value can occupy 32 bits in memory if the weight values are represented as 32-bit floating point numbers. Storing a large number of sparse weight matrices can take up a significant amount of memory to store the zero values and memory bandwidth to load the zero values from memory into the systolic array.

To improve the efficiency of a systolic array when performing computations on sparse weight matrices, the architecture of the systolic array can be implemented to skip unnecessary computations involving zero weight values.

Sparse weight matrices can be decomposed into constrained fine-grained sparse weight matrices that have at most a certain number of non-zero values (e.g., one non-zero value) in each column. These fine-grained sparse weight matrices can be stored in a compressed manner in memory without their zero values. For example, a constrained fine-grained sparse weight matrix can be stored as a set of non-zero weight values with metadata to indicate which row of the fine-grained spare weight matrix that the non-zero value corresponds to.

During operation, the non-zero weight values of the constrained fine-grained sparse weight matrix can be loaded into one row of the systolic array. The number of feature map (FMAP) input data buses can be expanded such that multiple rows of FMAP input elements are inputted into one row of the systolic array. Each processing element in that row of the systolic array can select the appropriate FMAP input element based on the metadata for the weight value loaded into the processing element. The processing element can then multiply the non-zero weight value with the selected FMAP input element, and add the result to a partial sum input to generate a partial sum output. In this manner, matrix multiplication operations can be performed on each constrained fine-grained sparse weight matrix using just one row of the systolic array. A matrix multiplication performed on a constrained fine-grained sparse weight matrix may be referred to as a sparse matrix multiplication.

Using this architecture, the number of rows of processing elements that are used to perform a sparse matrix multiplication can be minimized. Unused rows can either be turned off to reduce power consumption, or be repurposed to perform additional computations to increase the systolic array's utilization. The memory footprint of the weight matrix can also be reduced, and memory bandwidth that would otherwise be used to load the zero weight values from memory into the systolic array can be preserved.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 includes a block diagram illustrating an example of a host system 100 on which a compiler 130, such as is described herein, can run. The illustrated host system 100 is an example of a computing device, and includes a processor 102, a processor memory 104, at least one storage device 106, various Input/Output (I/O) devices 108, and at least one network interface 110. In the example of FIG. 1, the host system 100 also includes an acceleration engine 112, which is an integrated circuit device that can accelerate certain operations or computations performed by the host system 100. In various examples, the host system 100 can be implemented as a server in a data center, a desktop computer, a laptop computer, a tablet computer, or a smartphone, among other examples. In some examples, operations or components discussed below as performed or included in the host system 100 can be performed or included in other computer devices. For example, the compiler 130 can execute on the host system 100 while the acceleration engine 112 is located at a different host system.

The processor 102 is an integrated circuit device that can execute program code, in the form of instructions. The program code can be for various software applications or tools, such as an operating system 120 or the illustrated compiler 130. While the processor 102 is executing a program, the instructions for the program can be stored in the processor memory 104. The instructions can also be stored elsewhere, such as on the storage device 106, and can be loaded into the processor memory 104 when needed by the processor 102. The processor 102 can also use the processor memory 104 for temporary storage of other data on which the processor 102 is operating. In various examples, the processor memory 104 is a volatile memory type, such as a type of Random Access Memory, though non-volatile memory types can, alternatively or additionally, be used for the processor memory 104.

The storage device 106 is an example of a device that can include non-volatile memory. For example, the storage device 106 can be a magnetic disk drive, a solid state drive, or an optical drive, among other examples. The storage device 106 can further be non-transitory, such that program code and other data stored on the storage device 106 remains present when the storage device 106 is not powered on.

The storage device 106 is one example of a peripheral device, which are components that can be coupled to the host system 100 to add functionality to the host system 100. Other examples of peripheral devices include the Input/Output devices 108 and the network interface 110. The Input/Output devices 108 can include user input and output devices, such as keyboards, mice, touch screens, microphones, display screens, speakers, printers, and scanners, among other examples. The network interface 110, which can be implemented using a network interface card, can provide access to one or more networks. The network interface 110 can include, for example, a physical port for connecting a network cable and/or wireless antennas for communicating with Wi-Fi and/or cellular networks. The network interface 110 can also be described as an I/O device.

The acceleration engine 112 is also another type of peripheral device or I/O device. The acceleration engine 112 is a device that is purpose built to perform certain operations that may be performed by the processor 102, but can be performed faster by the acceleration engine 112. For example, the acceleration engine 112 can be a neural network accelerator, and, as such, may be able to perform the large scale, parallel computations of a neural network more efficiently than when the computations are performed by the processor 102. As another example, the acceleration engine 112 can be a graphics processing unit (GPU), and may be optimized to perform the computations needed for graphics rendering. Other examples of devices that can be implemented by the acceleration engine 112 include cryptographic accelerators, compression and decompression accelerators, 3-D accelerators, regular expression accelerators, security accelerators, and others.

In various examples, the acceleration engine 112 can execute program code to perform certain operations. For example, when the acceleration engine 112 is a neural network accelerator, the acceleration engine 112 can be programmed to execute a particular neural network, such as one that performs image recognition or one that performs machine translation. As a further example, to support the execution of a neural network, the acceleration engine 112 can be programed to perform operations such as copying data for the neural network from processor memory 104 (for example) into the acceleration engine 112, copying input data for the neural network from processor memory 104 into the acceleration engine 112, and/or copying results from the acceleration engine 112 into the processor memory 104, among other examples.

To generate program code or instructions for the acceleration engine 112, in various examples, the host system 100 can execute the compiler 130. Compilers, in general, are software programs that translate program code written in a human-readable language into a format (e.g., machine instructions) that can be read and processed by an integrated circuit device. In the example of FIG. 1, the acceleration engine 112 is a neural network accelerator and the compiler 130 is for compiling a neural network description into instructions to be executed by the acceleration engine 112. When the acceleration engine 112 implements a different type of accelerator, another compiler can be used.

The compiler 130 can be activated, for example, when the operating system 120 receives keyboard, mouse, touchscreen, voice commands, or other inputs from the Input/Output devices 108. The inputs can further include parameters for the compiler 130, such as the input code 142 to compile and configuration options for the compilation process. Once the compiler 130 is activated, the processor 102 can load the instructions for the compiler 130 into the processor memory 104, and can execute the instructions.

In the example of FIG. 1, the compiler 130 includes a first stage 132, a second stage 136, and a third stage 140, which each perform different operations to produce compiled code 144. In other examples, the compiler 130 can combine the operations of the first stage 132, second stage 136, and/or third stage 140 into fewer stages, or can divide the operations of one of the stages into multiple stages.

The first stage 132 can receive and process input code 142. The input code 142 can describe a program in a high-level programming language, such as Java, C++, or Tensorflow, among many other examples. The input code 142 can describe, for example, steps to perform image recognition, speech recognition, machine translation, or other operations. The input code 142 can be obtained, for example, from the storage device 106. Alternatively, though not illustrated here, the input code 142 may be located in the processor memory 104 or can be obtained from a network location, using the network interface 110. Processing of the input code 142 can include sorting the operations described in the input code 142 into layers, where the outputs of one layer provide the inputs to a next layer. Processing can also include identifying steps to be performed by the processor 102, rather than by the acceleration engine 112. For example, the processor 102, through the execution of a driver 122, may need to perform steps such as configuring Direct Memory Access (DMA) descriptors for moving data into or out of the acceleration engine 112, among other examples.

The output 134 of the first stage 132 can be organized, for example, in the layers, nodes, and connections between nodes of a neural network. The second stage 136 can perform intermediate processing on this output 134. For example, the operations performed in any one layer, or at any one node in a layer, may be too many for the acceleration engine 112 to perform at the same time. The acceleration engine 112 may, for example, have a limited amount of local storage space for the data needed for a computation, or the computations may be more than the acceleration engine 112 can perform at one time. In this example, the first stage 132 can break the operations of the layer or node down into smaller operations, which can fit into the acceleration engine's local memory and/or can fit into the computing capacity of the acceleration engine 112. Processing of the output 134 of the first stage 132 can include other steps, such as scheduling, or determining the order in which the acceleration engine 112 and/or processor 102 will perform operations, among other examples.

In various examples, the output 138 of the second stage 136 includes the various steps to be performed by components of the acceleration engine 112, in the order that the steps are to be performed. The output 138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 140 can operate on the output 138 of the second stage 136, and perform various steps before producing the instructions that are to be executed by the acceleration engine 112. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 140 can include a data scheduler 150 that determines how and when input data are loaded into the accelerator engine 112.

The output of the third stage 140 is compiled code 144, which may include machine instructions in binary format. In some examples, the compiled code 144 can be stored in the processor memory 104. Alternatively or additionally, the compiled code 144 can be copied to the storage device 106 or to a network location. As noted above, the acceleration engine 112 may be located at a different host system, in which case the compiled code 144 can be sent over the network interface 110 to the other host system.

In the example of FIG. 1, the host system 100 can be executing a driver 122, which can also be referred to as a device driver or runtime driver, that manages the acceleration engine 112. The driver 122 can provide an interface between applications executing on the host system 100 (or on another host system) and the acceleration engine 112. For example, the driver 122 can provide an Application Program Interface (API) that defines functions for feeding input data to the acceleration engine 112 and defining the operation to perform on the input data. In this and other examples, the driver 122 can configure the acceleration engine 112 to perform the operation. For example, the driver 122 can identify a neural network that the acceleration engine 112 is to execute, as well as the location in the processor memory 104 or on the storage device 106 where the compiled code 144 for the neural network is located. The driver 122 can further load into the acceleration engine 112 or cause the acceleration engine 112 to load the compiled code 144, can load or cause the acceleration engine 112 to load the input data on which the neural network is to operate, and/or can cause the acceleration engine 112 to being executing on the input data. Once the acceleration engine 112 has finished, the acceleration engine 112 can notify the driver 122, and the driver 122 can deliver a result back to the application that requested the result.

Figure 2:
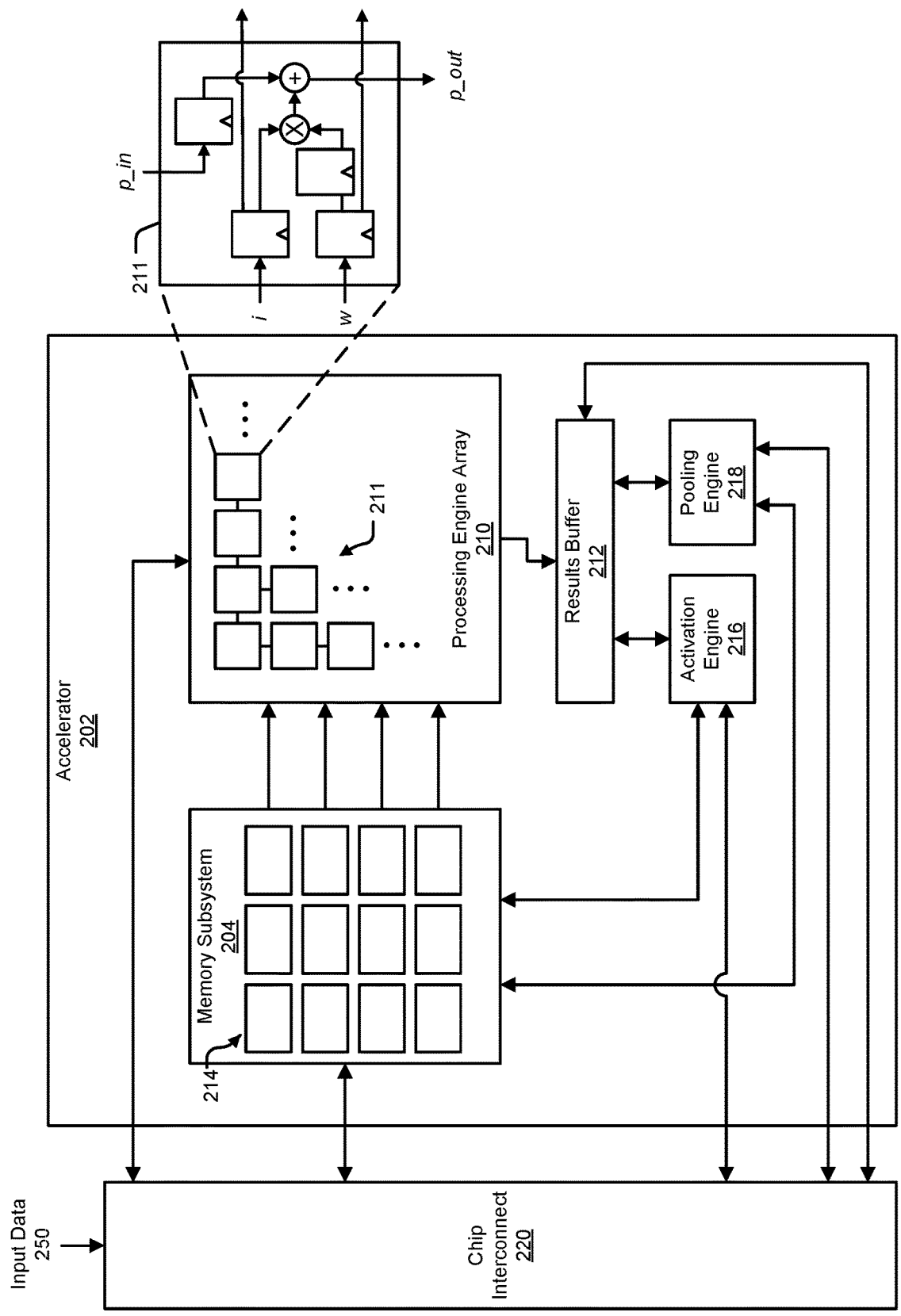
FIG. 2 illustrates a block diagram of an example of an integrated circuit device.

FIG. 2 is a block diagram illustrating an example of an integrated circuit device that can include a systolic array. The example of FIG. 2 illustrates an accelerator 202. In various examples, the accelerator 202, for a set of input data (e.g., input data 250), can execute computations using a processing engine array 210 (e.g., a systolic array), an activation engine 216, and/or a pooling engine 218. In some examples, the example accelerator 202 may be an integrated circuit component of a processor, such as a neural network processor. The processor may have other integrated circuit components, including additional accelerator engines.

In various implementations, the memory subsystem 204 can include multiple memory banks 214. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, values can be simultaneously read and provided to each row of the processing engine array 210, so that the entire processing engine array 210 can be in use in one clock cycle. As another example, the memory banks 214 can be read at the same time that results computed by the processing engine array 210 are written to the memory subsystem 204. In contrast, a single memory may be able to service only one read or write at a time. With a single memory, multiple clock cycles can be required, for example, to read input data for each row of the processing engine array 210 before the processing engine array 210 can be started.

In various implementations, the memory subsystem 204 can be configured to simultaneously service multiple clients, including the processing engine array 210, the activation engine 216, the pooling engine 218, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In some cases, each column of the processing engine array 210 can output a result, such that each column can count as a separate write client. In some cases, output from the processing engine array 210 can be written into the memory banks 214 that can then subsequently provide input data for the processing engine array 210. As another example, the activation engine 216 and the pooling engine 218 can include multiple execution channels, each of which can be separate memory clients. The memory banks 214 can be implemented, for example, using static random access memory (SRAM).

In various implementations, the memory subsystem 204 can include control logic. The control logic can, for example, keep track of the address spaces of each of the memory banks 214, identify memory banks 214 to read from or write to, and/or move data between the memory banks 214. In some implementations, memory banks 214 can be hardwired to particular clients. For example, a set of memory banks 214 can be hardwired to provide values to the rows of the processing engine array 210, with one memory bank servicing each row. As another example, a set of memory banks can be hard wired to receive values from columns of the processing engine array 210, with one memory bank receiving data for each column.

The processing engine array 210 is the computation matrix of the example accelerator 202. The processing engine array 210 can, for example, execute parallel integration, convolution, correlation, and/or matrix multiplication, among other things. The processing engine array 210 includes multiple processing elements 211, arranged in rows and columns, such that results output by one processing element 211 can be input directly into another processing element 211. A processing element 211 may also be referred to as a cell of the array. Processing elements 211 that are not on the outside edges of the processing engine array 210 thus can receive data to operate on from other processing elements 211, rather than from the memory subsystem 204.

In various examples, the processing engine array 210 uses systolic execution, in which data arrives at each processing element 211 from different directions at regular intervals. In some examples, input data can flow into the processing engine array 210 from the left and weight values can be loaded at the top. In some examples weights and input data (e.g., FMAP input elements) can flow from the left, and partial sums for accumulation can flow from top to bottom. In these and other examples, a multiply-and-accumulate operation moves through the processing engine array 210 as a diagonal wave front, with data moving to the right and down across the array. Control signals can be input at the left at the same time as weights, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 128 columns and 128 rows, or some other number of columns and rows.

An example of a processing element 211 is illustrated in FIG. 2 in an inset diagram. As illustrated by this example, a processing element 211 can include a multiplier-accumulator circuitry. Inputs from the left can include, for example, input data i and a weight value w, where the input data can be a feature map (FMAP) input element taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 211.

In the illustrated example, an input from above can include a partial sum, p_in, provided either from another processing element 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing element 211. Various other implementations of the processing element 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214 can be read from the memory subsystem 204 over the communication fabric 220, to be output by the system.

In some implementations, the accelerator 202 includes an activation engine 216. In these implementations, the activation engine 216 can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation engine 216 can be bypassed.

In various examples, the activation engine 216 can include multiple separate execution channels. In these examples, the execution channels can correspond to the columns of the processing engine array 210, and can perform an operation on the outputs of a column, the result of which can be stored in the memory subsystem 204. In these examples, the activation engine 216 may be able to perform between 1 and n parallel computations, where n is equal to the number of columns in the processing engine array 210. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 202 can include a pooling engine 218. Pooling is the combining of outputs of the columns of the processing engine array 210. Combining can include for example, computing a maximum value, a minimum value, an average value, a median value, a summation, a multiplication, or another logical or mathematical combination. In various examples, the pooling engine 218 can include multiple execution channels that can operating on values from corresponding columns of the processing engine array 210. In these examples, the pooling engine 218 may be able to perform between 1 and n parallel computations, where n is equal to the number of columns in the processing engine array 210. In various examples, execution channels of the pooling engine 218 can operate in parallel and/or simultaneously. In some examples, the pooling engine 218 can be bypassed.

Herein, the activation engine 216 and the pooling engine 218 may be referred to collectively as execution engines. The processing engine array 210 is another example of an execution engine. Another example of an execution engine is a Direct Memory Access (DMA) engine, which may be located outside the accelerator 202.

Input data 250 can arrive over the communication fabric 220. The communication fabric 220 can connect the accelerator 202 to other components of a processor, such as a DMA engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car or virtual reality data. In some implementations, the memory subsystem 204 can include a separate buffer for the input data 250. In some implementations, the input data 250 can be stored in the memory banks 214 when the accelerator 202 receives the input data 250.

In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference.

The weights for the neural network can be stored in the memory subsystem 204, along with input data 250 on which the neural network will operate. The neural network can also include instructions, which can program the processing engine array 210 to perform various computations on the weights and the input data. The instructions can also be stored in the memory subsystem 204, in the memory banks 214 or in a separate instruction buffer. The processing engine array 210 can output intermediate results, which represent the outputs of individual layers of the neural network. In some cases, the activation engine 216 and/or pooling engine 218 may be enabled for computations called for by certain layers of the neural network. The accelerator 202 can store the intermediate results in the memory subsystem 204 for inputting into the processing engine array 210 to compute results for the next layer of the neural network. The processing engine array 210 can further output final results from a last layer of the neural network. The final results can be stored in the memory subsystem 204 and then be copied out to host processor memory or to another location.

Figure 3:
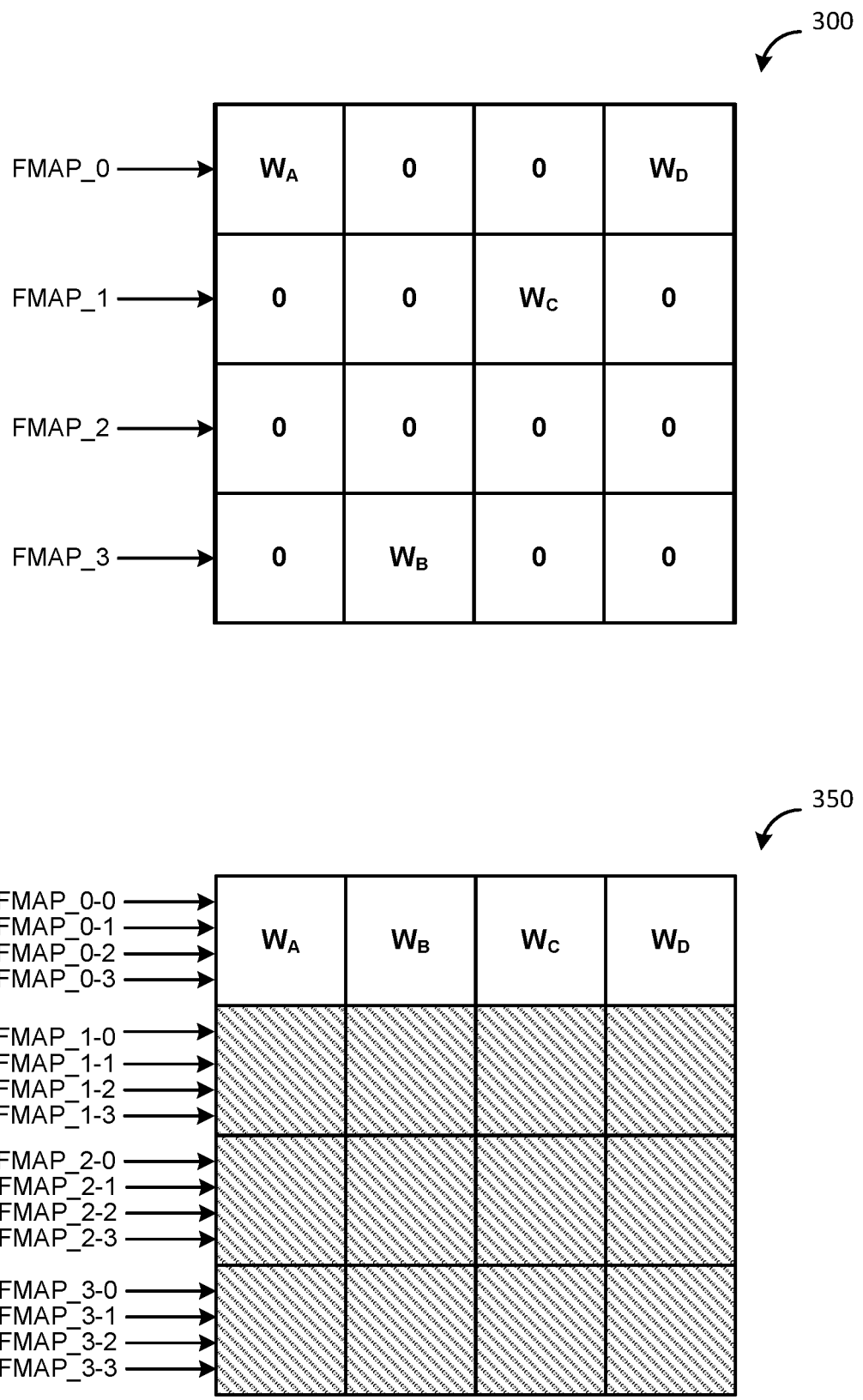
FIG. 3 illustrates a conceptual diagram of examples of a sparse matric multiplication being performed on systolic arrays of different architectures.

FIG. 3 illustrates a conceptual diagram of an example of performing a sparse matrix multiplication using a systolic array 300 being compared with performing the same sparse matrix multiplication on an array of processing elements 350 that is tailored for sparse matrix multiplications. For ease of explanation, the arrays are shown as having four rows of processing elements and four columns of processing elements, and the weight matrix in this example is shown as a 4×4 matrix. It should be understood that the array of processing elements in other implementations can have a different number of rows and/or columns, and that the number of rows need not be equal to the number of columns. Likewise, the two-dimensional weight matrix can take on other dimensions and need not be a square matrix.

In FIG. 3, systolic array 300 is loaded with a 4×4 weight matrix having four non-zero weight values $W_A$, $W_B$, $W_C$, and $W_D$, and the remaining twelve weight values being zeros. Each column of the weight matrix has at most one non-zero weight value. As such, the weight matrix loaded into systolic array 300 can be considered as a constrained fine-grained sparse matrix. The sparsity of a matrix can be determined as the ratio of the number of elements having a zero value to the total number of elements. Thus, the sparsity of the weight matrix shown in FIG. 3 can be determined as the ratio of twelve elements having a zero value to sixteen total elements, or a sparsity of 75%.

During operation, each row of systolic array 300 has one FMAP input data bus to shift in FMAP input data into the processing elements (PEs) of the corresponding row. As the FMAP input elements are being shifted into the array, each PE multiplies the FMAP input element with the weight value previously loaded into the PE, and the multiplication results are accumulated or summed along each column of the array to generate a partial sum. Because multiplication of zero results in zero, and addition of zero has no effect on the partial sum, the computations performed by the PEs loaded with a zero weight value has no impact on the computation results. In the example shown in FIG. 3, three PEs in each column are performing computations that have no effect on the partial sum of the column. Thus, with a weight matrix having a 75% sparsity as shown, 75% of the PEs in systolic array 300 are performing unnecessary computations.

The structure of PE array 350 differs from systolic array 300 in that each row of PE array 350 has four FMAP row input data buses. During operation, instead of loading the entire weight matrix including the twelve zero values into the array, the four non-zero weight values $W_A$, $W_B$, $W_C$, and $W_D$ are loaded into just one row of PE array 350. To provide the PEs in that row with the proper FMAP input elements to multiply with their respective weight values, the FMAP input elements provided to the different rows of systolic array 300 on the four row input data buses are all provided to the same row of PE array 350. Each PE can then select the proper FMAP input element to perform the multiplication operation based on the position of the non-zero weight value in the weight matrix.

Thus, to perform the proper matrix multiplication, the PE loaded with non-zero weight value $W_A$ selects the FMAP input element from the FMAP_0-0 bus, because the weight value $W_A$ is on row 0 of the weight matrix. The PE loaded with non-zero weight value $W_B$ selects the FMAP input element from the FMAP_0-3 bus, because the weight value $W_B$ is on row 3 of the weight matrix. The PE loaded with non-zero weight value $W_C$ selects the FMAP input element from the FMAP_0-1 bus, because the weight value $W_C$ is on row 1 of the weight matrix. The PE loaded with non-zero weight value $W_D$ selects the FMAP input element from the FMAP_0-0 bus, because the weight value $W_D$ is on row 0 of the weight matrix.

Accordingly, by having additional FMAP row input data buses on each row of PE array 350, PE array 350 can perform the same matrix multiplication operation on the two-dimensional constrained fine-grained sparse weight matrix as systolic array 300, but using just one row of PEs instead of the entire array. The sparsity capability of a PE array indicating the optimal sparsity of a fine-grained sparse weight matrix that one row of the PE array supports can be determined as (n−1)/n, where n is the number of FMAP row input data buses for each row of the PE array. Thus, the sparsity capability of PE array 350 is ¾ or 75%, and PE array 350 is optimized for performing matrix multiplications on constrained fine-grained sparse weight matrices having a sparsity of 75%. In other implementations, the PE array can implement a different number of FMAP row input data buses per row of PEs (e.g., two, three, eight, sixteen FMAP row input data buses per row, etc.) to optimize for weight matrices with other sparsity ratios.

Although the structure of PE array 350 can be optimized to perform computations on certain sparse weight matrices, the structure of PE array 350 also allows PE array 350 to perform matrix multiplication operations on dense weight matrices by utilizing the entire array. For example, PE array 350 can operate in a normal mode of operation in which a 4×4 dense weight matrix is loaded into the entire array similar to systolic array 300, and one of the four FMAP row input data buses in each row can be designated as the FMAP row input data bus used in this normal mode of operation. The matrix multiplication operation can be executed in a similar manner as systolic array 300 by shifting in the FMAP input data on the designated FMAP row input data bus of each row. Depending on the neural network layer, the neural network model, and/or the application being executed, PE array 350 can transition seamlessly back and forth between operating in the sparsity mode of operation to perform a sparse matrix multiplication operation on a constrained fine-grained sparse weight matrix loaded into a row of the array, and a normal mode of operation to perform a matrix multiplication on a dense weight matrix loaded into the entire array.

As discussed above, to perform the proper matrix multiplication on a constrained fine-grained sparse weight matrix using one row of PE array 350 in the sparsity mode of operation, each processing element being used is configured to select the appropriate FMAP input element from one of the four FMAP row input data buses. The information used to select the appropriate FMAP input element represents the row of the weight matrix corresponding to the weight value loaded into the processing element. Thus, to facilitate proper operation of the processing element in the sparsity mode of operation, metadata associated with the non-zero weight value is also provided to the processing element. The metadata can include sparsity row information to indicate which row of the two-dimensional fine-grained sparse weight matrix that the non-zero weight value corresponds to.

In some implementations, the sparsity row information can be encoded using one-hot encoding such that each bit of the sparsity row information represents a row of the weight matrix. By way of example, the sparsity row information associated with $W_A$ can be encoded as b0001 to indicate that $W_A$ is on row 0 of the weight matrix (with the least significant bit (LSB) representing row 0). The sparsity row information associated with $W_B$ can be encoded as b1000 to indicate that $W_B$ is on row 3 of the weight matrix. The sparsity row information associated with $W_C$ can be encoded as b0010 to indicate that $W_C$ is on row 1 of the weight matrix. The sparsity row information associated with $W_D$ can be encoded as b0001 to indicate that $W_D$ is on row 0 of the weight matrix.

The one-hot encoding scheme can also be used to control whether the array operates in the sparsity mode of operation or in the normal mode of operation. For example, metadata having a default value such as b0000 or b1111 can be used to control the processing element to operate in the normal mode of operation. When the processing element receives metadata having the default value, the processing element can select the FMAP input element from the predetermined FMAP row input data bus designated for the normal mode of operation. In some implementations, the processing element can select the FMAP input element from the predetermined FMAP row input data bus designated for the normal mode of operation when no metadata or an undefined value is received. When the processing element receives metadata values corresponding to valid sparsity row information, the processing element can select the FMAP input element according to the sparsity row information.

In some implementations, to reduce the number of bits representing the sparsity row information, a row number can be used such that the sparsity row information can be encoded using log 2 (n) number of bits, where n is the number of rows in the weight matrix. For example, the sparsity row information associated with $W_A$ can be encoded as b00=0 to indicate that $W_A$ is on row 0 of the weight matrix. The sparsity row information associated with $W_B$ can be encoded as b11=3 to indicate that $W_B$ is on row 3 of the weight matrix. The sparsity row information associated with $W_C$ can be encoded as b01=1 to indicate that $W_C$ is on row 1 of the weight matrix. The sparsity row information associated with $W_D$ can be encoded as b00 to indicate that $W_D$ is on row 0 of the weight matrix. When using a row number to represent the sparsity row information, the metadata can include an additional mode bit to represent mode information to switch between the sparsity mode of operation and the normal mode of operation. In other implementations, other types of encoding and technique can be used to represent the sparsity row information and/or mode information.

The use of sparsity row information can also allow the weight matrix to be stored in a compressed format without some or all of the zero values of the weight matrix. Although the weight matrix shown in FIG. 3 has twelve zero values, the weight matrix may nevertheless be stored as sixteen floating-point numbers to account for all sixteen weight values. Hence, if the weight values are represented as 32-bit floating point numbers, the weight matrix would occupy 16×32=512 bits of memory. However, by using the sparsity row information, the zero values of the weight matrix need not be stored in memory because the weight matrix can be reconstructed using the non-zero weight values together with their associated sparsity row information.

Taking the one-hot encoding as an example, each non-zero weight value can be associated with four additional bits of metadata representing the sparsity row information, and thus each non-zero weight value can be represented using 36 bits. The weight matrix would then only occupy 4×36=144 bits of memory to store the four non-zero weight values and their sparsity row information. This provides a significant memory saving of almost 72%. Further memory savings can be achieved, for example, by using a row number to represent the sparsity row information. The reduction in memory space needed to store the weight matrix can also translate to improve memory bandwidth utilization, because it is not necessary to expend memory access cycles to load the zero weight values from memory into the PE array.

One advantage of operating PE array 350 in the sparsity mode of operation is that unused rows of the array can be turned off when PE array 350 is performing a sparse matrix multiplication on a fine-grained sparse matrix. This is indicated in FIG. 3 by the bottom three shaded rows of PE array 350 in which at least the computational logic for performing the multiplication and summation operations can be turned off, resulting in up to 75% of power savings in the PE array. Another advantage of operating PE array 350 in the sparsity mode of operation is that unused rows of the array can be repurposed to perform addition computations to maximize utilization of the PE array.

Figure 4:
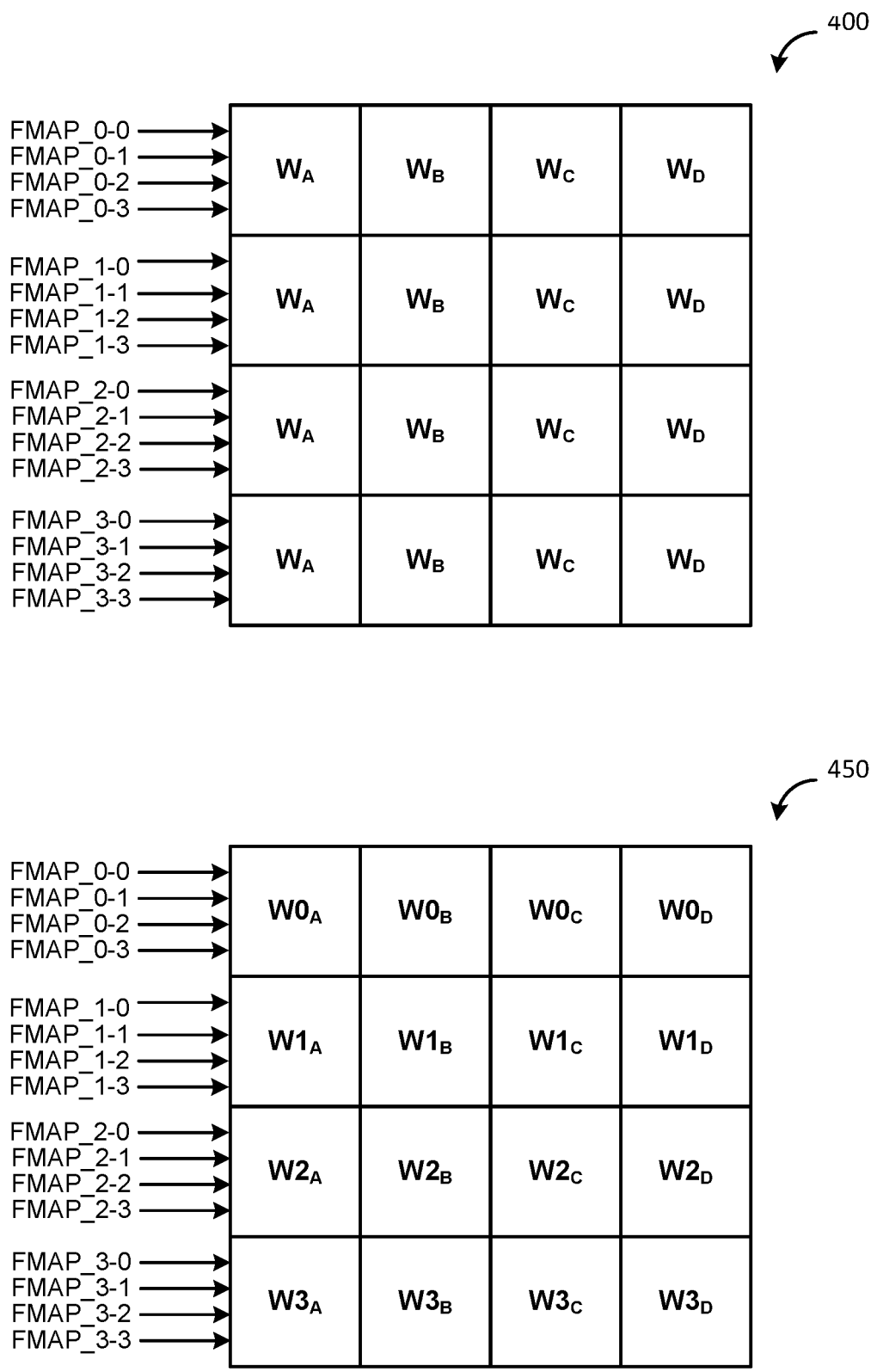
FIG. 4 illustrates a conceptual diagram of examples of fully utilizing an array of processing elements when performing sparse matrix multiplications.

FIG. 4 illustrates a conceptual diagram showing examples of operating a PE array at full capacity in the sparsity mode of operation. In PE array 400, the same fine-grained sparse weight matrix is loaded into each row of PE array 400. Each row of PE array 400 can operate on a different set of FMAP input data to concurrently perform four sets of sparse matrix multiplication operations on the same fine-grained sparse matrix. This manner of operation can be used in applications and neural network models where the results of applying different FMAP input data to the same weight matrix are summed together. PE array 400 can provide 4× the performance when compared to systolic array 300.

In PE array 450, each row is loaded with a different fine-grained sparse weight matrix. Each row of PE array 400 can operate on the same set of FMAP input data to concurrently perform four sets of sparse matrix multiplication operations on the same FMAP input data with different weight matrices. PE array 450 can also provide 4× the performance when compared to systolic array 300. PE array 450 can be a more prominent manner of operation that maximizes utilization and computational performance of the array, and can be used in applications and neural network models where the results of applying different weights to the same FMAP input data are summed together.

Figure 5:
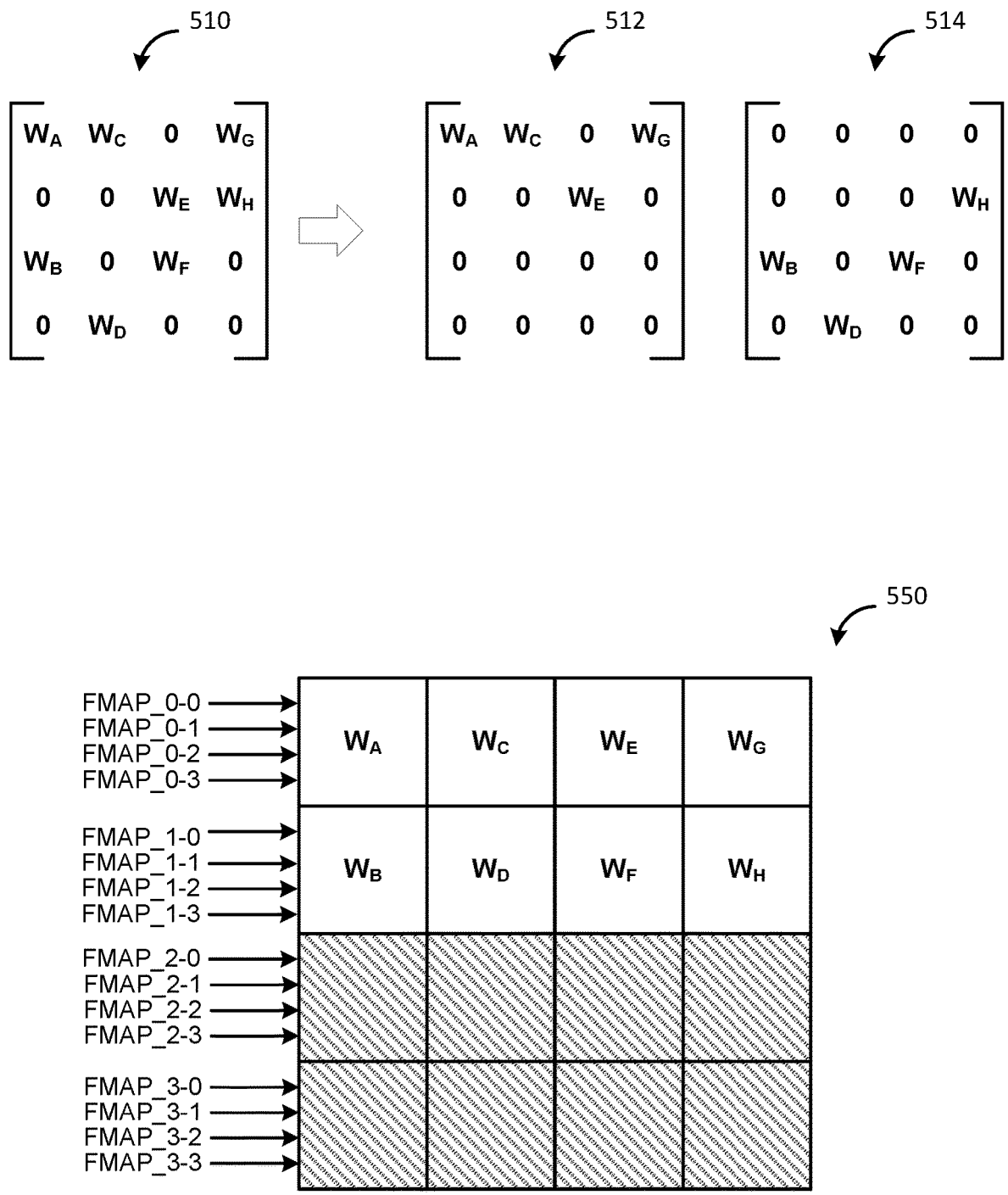
FIG. 5 illustrates a conceptual diagram of an example of decomposing a weight matrix into constrained fine-grained sparse matrices.

In other implementations, a PE array operating in the sparsity mode of operation can be loaded with other combinations of the same or different fine-grained sparse weight matrices, and the PE array can apply the loaded weight values to the same or different sets of FMAP input data, depending on the application and neural network model being implemented. For example, a weight matrix that is denser than the sparsity capability of the PE array can be decomposed into a set of constrained fine-grained sparse matrices, and the constrained fine-grained sparse matrices can be loaded into respective rows of the PE array to perform the matrix multiplication operation using a reduced number of rows. Referring to the example shown in FIG. 5, a 4×4 weight matrix having 50% sparsity (e.g., two non-zero weight values per column) such as weight matrix 510 can be decomposed into two 4×4 constrained fine-grained sparse weight matrices 512 and 514 having at most one non-zero value in each column. The two fine-grained sparse weight matrices 512 and 514 can be loaded into two respective rows of PE array 550. These two rows of PE array 550 can operate on the same FMAP input data to achieve a matrix multiplication on weight matrix 510 using just two rows of PE array 550, as compared to using the entire array if systolic array 300 was used to perform the same computation. The remaining two rows of PE array 550 can be turned off as shown in FIG. 5, or be repurposed to perform other computations.

Figure 6:
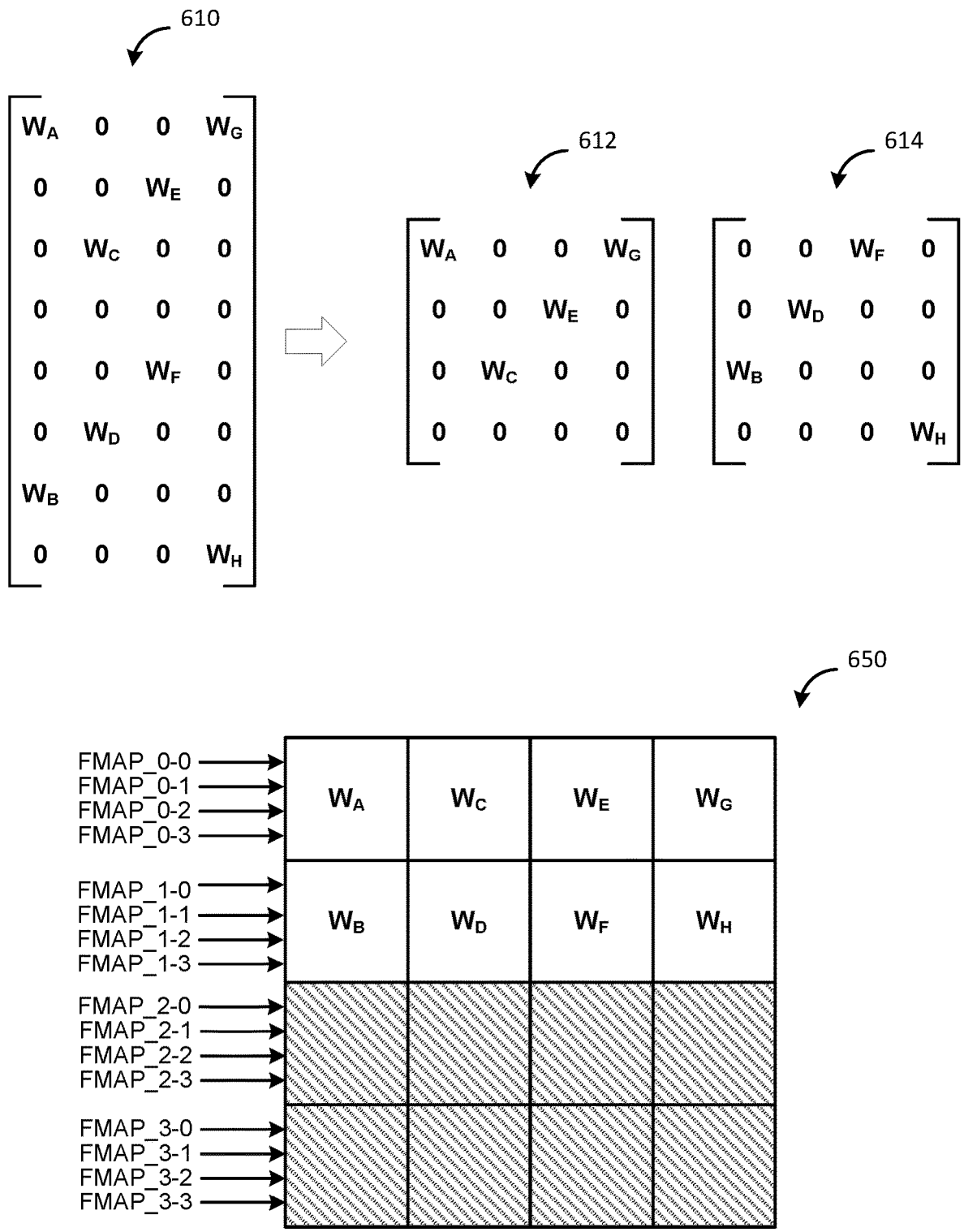
FIG. 6 illustrates a conceptual diagram of an example of partitioning a weight matrix into constrained fine-grained sparse matrices.

As another example, a large weight matrix can be partitioned into a set of constrained fine-grained sparse matrices, and the constrained fine-grained sparse matrices can be loaded into respective rows of the array to perform the matrix multiplication operation using a reduced number of rows. Referring to the example shown in FIG. 6, a 8×4 weight matrix such as weight matrix 610 can be partitioned into two 4×4 constrained fine-grained sparse weight matrices 612 and 614. The two constrained fine-grained sparse weight matrices 612 and 614 can be loaded into two respective rows of PE array 650. The FMAP input data can be partitioned into two subsets of FMAP input data, and these two rows of PE array 650 can operate respectively on the two different subsets of FMAP input data to achieve a matrix multiplication on weight matrix 610 using just two rows of PE array 650. The remaining two rows of PE array 650 can be turned off as shown in FIG. 6, or be repurposed to perform other computations. In some implementations, the technique of FIGS. 5-6 can be combined to partition a large weight matrix into smaller weight matrices that may not necessarily be constrained fine-grained sparse matrices, and the smaller weight matrices can be decomposed into fine-grained sparse matrices of the same size.

Figure 7:
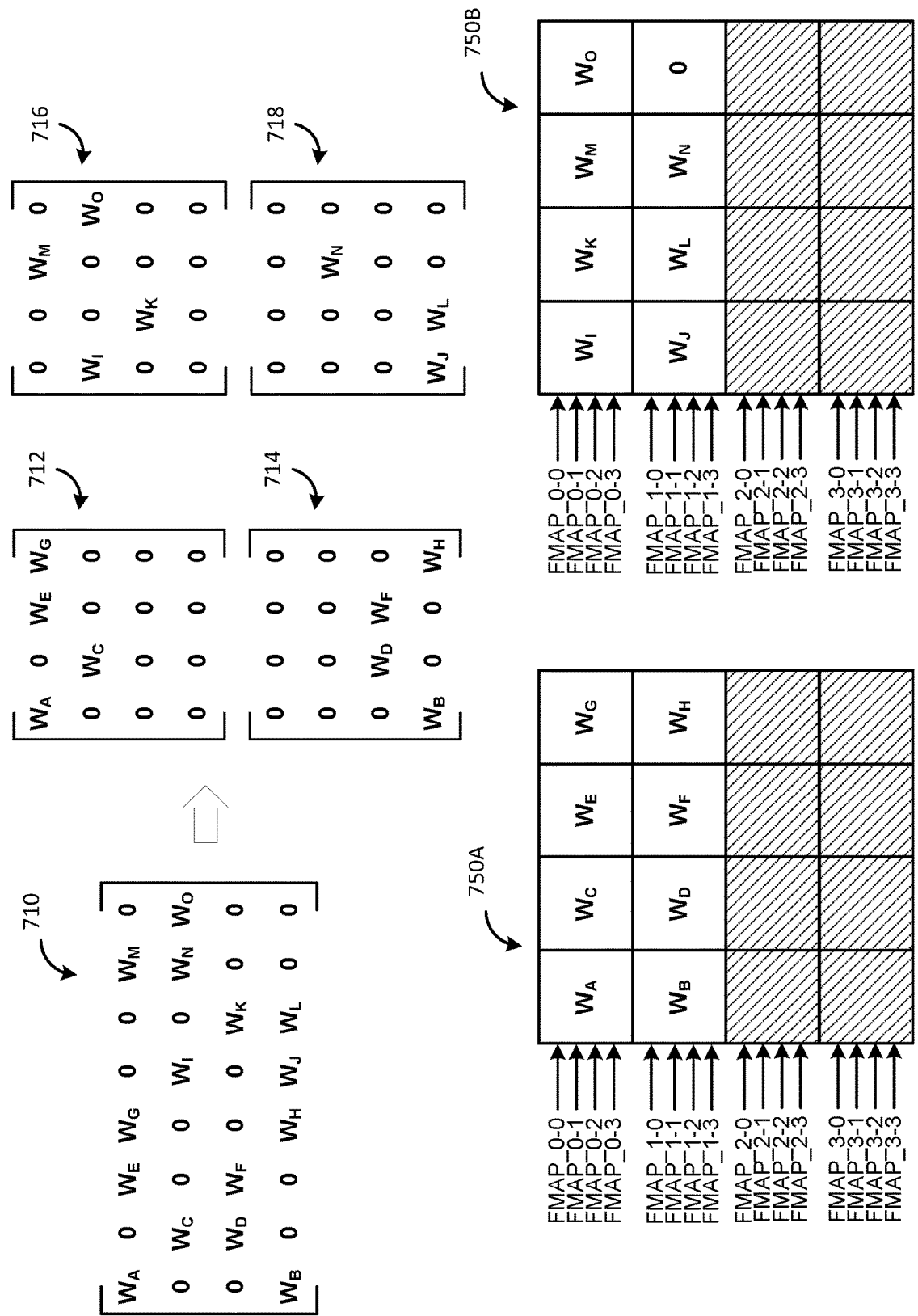
FIG. 7 illustrates a conceptual diagram of an example of partitioning and decomposing a weight matrix into constrained fine-grained sparse matrices.

FIG. 7 illustrates a large weight matrix can be partitioned and decomposed into a set of constrained fine-grained sparse matrices, and the constrained fine-grained sparse matrices can be loaded into respective rows of the array to perform the matrix multiplication operation using a reduced number of rows. Referring to the example shown in FIG. 7, a 4×8 weight matrix such as weight matrix 710 can be partitioned into two 4×4 weight matrices corresponding to the left half of weight matrix 710 and the right half of weight matrix 710. The left half of weight matrix 710 can be decomposed into constrained fine-grained sparse weight matrices 712 and 714, and the right half of matrix 710 can be decomposed into constrained fine-grained sparse weight matrices 716 and 718. Because the number of columns of weight matrix exceeds the capacity of the PE array, the matrix multiplication computation of weight matrix 710 is computed in two passes or iterations through the PE array. During the first pass or iteration, the constrained fine-grained sparse weight matrices 712 and 714 can be loaded into two respective rows as shown in PE array 750A. During the second pass or iteration, the constrained fine-grained sparse weight matrices 716 and 718 can be loaded into two respective rows as shown in PE array 750B. The same set of FMAP input data are inputted into the array to achieve a matrix multiplication on weight matrix 710. During both passes or iterations, just two rows of the PE array are used. The remaining two rows can be turned off as shown in FIG. 7, or be repurposed to perform other computations to improve utilization and computational performance.

Figure 8:
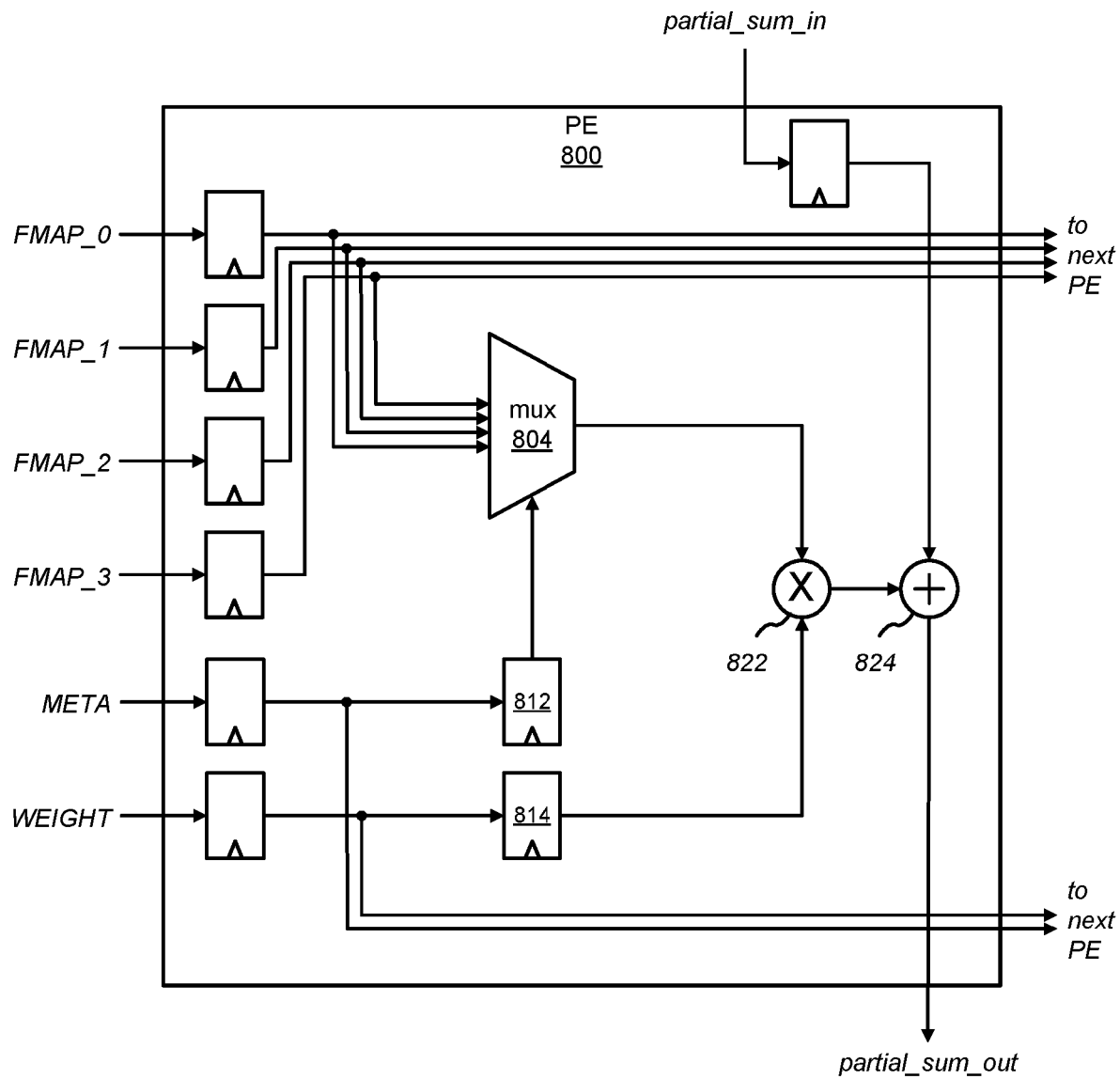
FIG. 8 illustrates a block diagram of an example of a processing element.

FIG. 8 illustrates a block diagram of an example of a processing element (PE) 800 that can support sparse matrix multiplications, according to some implementations. PE 800 can be part of an array of processing elements arranged in rows and columns, and can be implemented in a neural network processor to support sparse matrix multiplications. For example, PE 800 can be used in place of PE 211 in PE array 210 of acceleration circuit 202 in FIG. 2 to optimize PE array 210 for sparse matrix multiplication operations. The array of processing elements incorporating PE 800 can be operable in a sparsity mode of operation and a normal mode of operation. In the sparsity mode of operation, each row of the array of processing elements is operable to perform a sparse matrix multiplication operation on a two-dimensional constrained fine-grained sparse weight matrix. The two-dimensional constrained fine-grained sparse weight matrix may include at most one non-zero weight value in each column of the weight matrix. In the normal mode of operation, the array of processing elements is operable to perform a matrix multiplication operation on a weight matrix using multiple rows of the array of processing elements. In some implementations, the weight matrix used in the normal mode of operation may have no zero values or only a few zero values (e.g., less than 25% of weight values are zeros).

PE 800 may include multiple feature map (FMAP) input data buses such as FMAP_0, FMAP_1, FMAP_2, and FMAP_3 to receive FMAP input data elements, a weight input data bus WEIGHT to received weight values, and a metadata input data bus META to receive metadata associated with the weight values. In some implementations, the metadata associated with the weight values can be transmitted on the weight input data bus. It should also be understood that although four FMAP input data buses are shown, other implementations may have more or fewer number of FMAP input data buses. PE 800 also includes a partial sum input partial_sum_in and a partial sum output partial_sum_out.

The internal circuitry of PE 800 may include a weight register 814 configured to store a weight value, a metadata register 812 configured to store metadata associated with the weight value loaded in weight register 814, and a multiplexor circuit 804 configured to select, based on the metadata associated with the weight value, a FMAP input element from one of the FMAP input data buses (e.g., FMAP_0, FMAP_1, FMAP_2, and FMAP_3). PE 800 may also include a multiplier circuit 822 configured to multiply the selected FMAP input element with the weight value to generate a multiplication result, and an adder circuit 824 configured to add the multiplication result to the partial sum input to generate the partial sum output.

The metadata associated with the weight value stored in weight register 814 may include sparsity row information and/or mode information. The sparsity row information can be used in the sparsity mode of operation to indicate which row of a two-dimensional fine-grained sparse weight matrix that the weight value stored in weight register 814 corresponds to. In the sparsity mode of operation, multiplexor circuit 804 is configured to select the FMAP input element based on the sparsity row information. For example, if the sparsity row information indicates the weight value is on the second row of the two-dimensional fine-grained sparse weight matrix, then multiplexor circuit 804 would select the FMAP input element from the second FMAP row input data bus IMAP 1. In other words, in the sparsity mode of operation, the FMAP input element is selected from the FMAP row input data bus corresponding to the row indicated by the sparsity row information.

The mode information can be used to switch between the sparsity mode of operation and the normal mode of operation. In the normal mode of operation, multiplexor circuit 804 is configured to select the FMAP input element on a predetermined FMAP input data bus designated for normal mode. For example, if the first FMAP input data bus FMAP_0 is designated for use in normal mode, multiplexor circuit 804 can be configured to select the FMAP input element on the FMAP_0 when the mode information indicates PE 800 is to operate in the normal mode of operation.

In some implementations, both the sparsity row information and the mode information can be encoded in the same set of metadata bits. For example, the sparsity row information can be encoded using one-hot encoding (e.g., b0001 indicates row 0, b0010 indicates row 1, b0100 indicates row 2, b1000 indicates row 3, etc.), and the normal mode of operation can be indicated by a default value such as having all zeros or all ones in the one-hot encoding bits. In some implementations, the sparsity row information and the mode information can be encoded using separate metadata bits. For example, the sparsity row information can be encoded as a binary representation of the row number (e.g., b00 indicates row 0, b01 indicates row 1, b10 indicates row 2, b11 indicates row 3, etc.), and the mode information can be encoded using a mode bit (e.g., b0 indicates normal mode, b1 indicates sparsity mode, etc.).

FIG. 9 illustrates an example of a flow diagram of a process 900 for operating an acceleration circuit, according to some implementations. For example, the acceleration circuit can be part of a neural network processor that may include a memory and an array of processing elements arranged in rows and columns. Each row of processing element may include multiple feature map (FMAP) input data buses to support sparsity matrix multiplications.

At block 902, non-zero weight values of a constrained fine-grained sparse weight matrix can be loaded into a row of the array of processing elements. The constrained fine-grained sparse weight matrix can be loaded from a memory that stores the constrained fine-grained sparse weight matrix as a set of the non-zero values. The memory may also store metadata associated with each of the non-zero values including sparsity row information indicating which row in the constrained fine-grained sparse weight matrix that the non-zero value corresponds to. The sparsity row information can be represented using one-hot encoding or using a row number.

At block 904, a sparse matrix multiplication operation can be performed on the constrained fine-grained sparse weight matrix in a sparsity mode of operation using one row of the array of processing elements. For example, each processing element in the row of the array of processing elements may receive a non-zero weight value from the constrained fine-grained sparse weight matrix, and a set of FMAP input elements on respective FMAP input data buses. The processing element may select the FMAP input element from the FMAP input data buses based on metadata (e.g., sparsity row information) associated with the non-zero weight value loaded into the processing element, multiplying the selected feature map input element with the non-zero weight value to generate a multiplication result, and adding the multiplication result to a column input to generate a partial sum for outputting to a column output.

In some implementations, the unused rows of the array of processing elements can be turned off to reduce power consumption while performing the sparse matrix multiplication operation on the constrained fine-grained sparse weight matrix at block 904. In some implementations, the array of processing elements can be operable to concurrently perform multiple sparse matrix multiplication operations respectively using multiple rows of the array of processing elements. For example, another sparse matrix multiplication operation can be performed using another row of the array of processing elements concurrently with the sparse matrix multiplication being performed at block 904.

The array of processing elements can transition from the sparsity mode of operation to a normal mode of operation, and vice versa. This change in operating mode can be effectuated, for example, by receiving mode information in the metadata to indicate a normal mode of operation. In some implementations, the change in operating mode may correspond to the acceleration circuit executing a different layer of the neural network, or to the acceleration circuit executing a different neural network.

At block 906, weight values of a weight matrix can be loaded into multiple rows of the array of processing elements. The weight matrix may include both zero and non-zero weight values, and both the zero and non-zero weight values can be loaded from a memory that stores every element of the weight matrix including any zero values. In some implementations, the weight matrix can be a two-dimensional weight matrix with no zero values or only a few zero values (e.g., less than 25% of elements are zeros).

At block 908, a matrix multiplication operation is performed on the weight matrix using multiple rows (e.g., every row) of processing elements in the normal mode of operation. In the normal mode of operation, each processing element being used may receive a weight value (e.g., can be zero or non-zero), and may select the FMAP input element from a predetermined FMAP input data bus designated for the normal mode of operation. The processing element may multiply the FMAP input element with the received weight value to generate a multiplication result, and adding the multiplication result to a column input to generate a partial sum for outputting to a column output.

Figure 10:
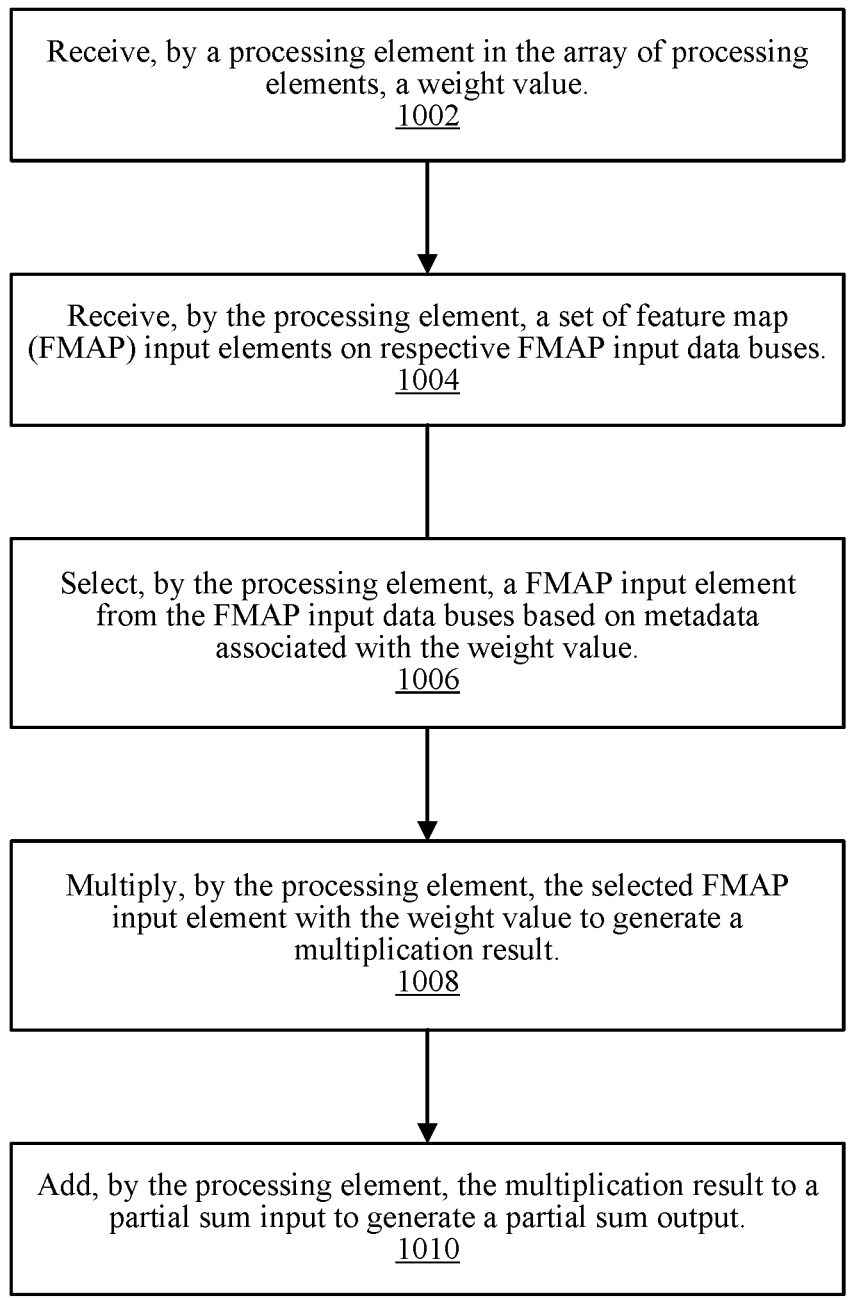
FIG. 10 illustrates a flow diagram of an example of a process performed by a processing element.

FIG. 10 illustrates an example of a flow diagram of a process 1000 performed by a processing element to execute matrix multiplication operation, according to some implementations. The processing element can be, for example, part of an array of processing elements in an acceleration circuit. At block 1002, the processing element in the array of processing elements may receive a weight value. At block 1004, the processing element may receive a set of feature map (FMAP) input elements on respective FMAP input data buses. At block 1006, the processing element may select a FMAP input element from the FMAP input data buses based on metadata associated with the weight value. At block 1008, the processing element may multiply the selected feature map input element with the weight value to generate a multiplication result. At block 1010, the processing element may add the multiplication result to a partial sum input to generate a partial sum. Additional details on the operation of the processing element has been described above, for example, with reference to FIG. 8. As such, a detailed description of which need not be repeated.

Figure 11:
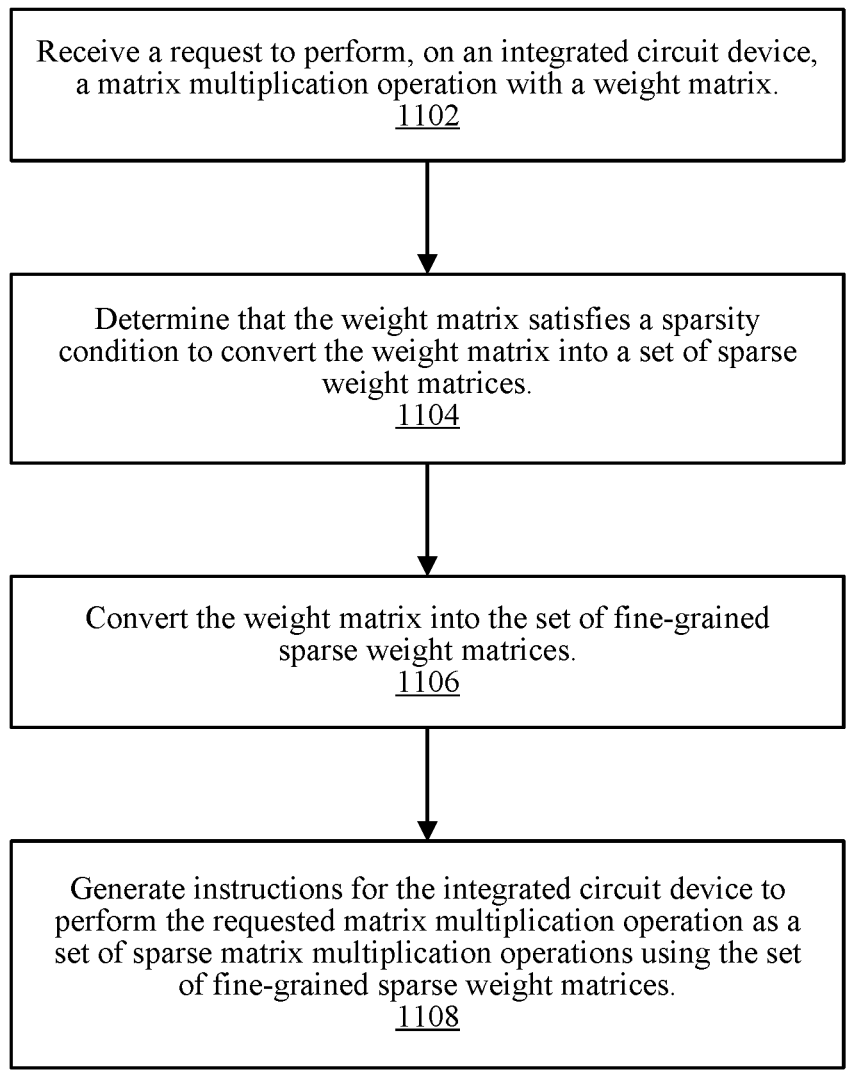
FIG. 11 illustrates a flow diagram of an example of a process to generate instructions for an integrated circuit device.

FIG. 11 illustrates an example of a flow diagram of a process 1100 for generating instructions for an integrated circuit device to perform a matrix multiplication operation, according to some implementations. The integrated circuit device can an integrated circuit device capable of performing matrix multiplication operations. In some implementations, the integrated circuit device can be an acceleration circuit or a neural network processor, and may include an array of processing elements (e.g., PE array) such as those described herein. Process 1100 can be performed, for example, by a software program executed by one or more processors on a host computing device. The software program can be a compiler or a runtime drive, and can be embodied in a non-transitory computer readable medium or be stored in a memory used by the host computing device.

Process 1100 may begin at block 1102 by receiving a request to perform, on an integrated circuit device, a matrix multiplication operation with a weight matrix. For example, the matrix multiplication operation being requested can be performed using an acceleration circuit having an array of processing elements. The request can be received by a compiler as part of a neural network description that is being compiled to run on the integrated circuit device. In some implementations, the request to perform the matrix multiplication operation can be received by a runtime driver as a compiled instruction. For example, a compiler may have compiled a neural network description into a set of instructions including an instruction to perform the matrix multiplication operation, and the runtime driver may convert that instruction according to process 1100 to take advantage of the hardware capabilities of the integrated circuit device.

At block 1104, a determination is made as to whether the weight matrix satisfies a sparsity condition to convert the weight matrix into a set of constrained fine-grained sparse weight matrices. For example, the sparsity condition to satisfy may include determining that the weight matrix has at least one zero value in each column of the weight matrix. In scenarios in which the weight matrix is a fully dense matrix with no non-zero values, converting the weight matrix into fine-grained sparse matrices may not necessarily improve performance or power consumption. In such scenarios, it may be unnecessary to convert the weight matrix.

In some implementations, the sparsity condition to satisfy may include determining that the weight matrix has a sparsity being greater than a predetermined sparsity threshold. The predetermined sparsity threshold may depend on the hardware architecture of the integrated circuit device (e.g., size of PE array, number of FMAP row input data buses per PE, etc.). By way of illustration, using the 4×4 PE array from FIG. 3 as an example, if a 4×4 weight matrix has only a 25% sparsity such that each column of the weight matrix has three non-zero weight values, it may not be worthwhile to convert the weight matrix, because it may not be feasible to repurpose the one unused row of the PE array for other calculations and any power savings may be small. Thus, with such an architecture, the predetermined sparsity threshold can be set to 25%. In other implementations, the predetermining sparsity threshold can be set to other ratios based on the particular hardware architecture of the integrated circuit device.

In some implementations, the sparsity condition to satisfy may include determining that the weight matrix has a sparsity pattern compatible with the integrated circuit device. For example, a weight matrix that is larger than the array size of the integrated circuit device can be considered to have a sparsity pattern compatible with the integrated circuit device if the weight matrix can be partitioned into sparse weight matrices that can fit into the array. In some implementations, this condition can be met when the number of rows of the weight matrix is an integer multiple of the number of FMAP row input data buses per row of the PE array. By way of example, referring back to FIG. 6, the 8×4 weight matrix 610 has eight rows, and PE array 650 has four rows. Given that the number of rows in weight matrix 610 is an integer multiple (2×) of the number of rows in PE array 650, weight matrix 610 can be partitioned into two weight matrices 612 and 614 that can each fit into PE array 650. Accordingly, weight matric 610 satisfies the condition for conversion into constrained fine-grained sparse weight matrices. In some implementations, the sparsity condition may require the weight matrix to have a sparsity being greater than a predetermined sparsity threshold and a sparsity pattern compatible with the integrated circuit device.

At block 1106, the weight matrix of the matrix multiplication request can be converted into a set of constrained fine-grained sparse weight matrices. Converting the weight matrix may include selecting a non-zero value from each column of the weight matrix to form each of the constrained fine-grained sparse weight matrices, such that each of the constrained fine-grained sparse matrix has one non-zero weight value in each column. In some implementations, one or more columns of a constrained fine-grained sparse matric may contain all zeros. This may occur, for example, if the original weight matrix does not have the same number of non-zero elements in each column.

In some implementations, sparsity row information for each non-zero weight value of the weight matrix can be generated. The sparsity row information is used to indicate which row of the weight matrix that the non-zero weight value corresponds to, and can be used to efficiently store the weight matrix without zero values as explained above. The software program executing process 1100 may also generate instructions for the integrated circuit device to store each of the constrained fine-grained sparse weight matrices as a set of non-zero values with their corresponding sparsity row information in a memory.

At block 11011, instructions for the integrated circuit device to perform the requested matrix multiplication operation can be generated as a set of sparse matrix multiplication operations using the set of constrained fine-grained sparse weight matrices. In implementations in which the integrated circuit device includes an array of processing elements such as those described herein, the set of sparse matrix multiplication operations may include performing a sparse matrix multiplication on a constrained fine-grained sparse weight matrix using one row of the array of processing elements. In other words, each sparse matrix multiplication operation can be performed using one row of the array of processing elements.

In some implementations, the set of sparse matrix multiplication operations may include concurrently performing multiple sparse matrix multiplications using multiple rows of the array of processing elements to multiply different sets of feature map inputs with the same fine-grained sparse weight matrix. An example of an integrated circuit device executing such instructions is shown in PE array 400 of FIG. 4. A constrained fine-grained sparse weight matrix converted from the original weight matrix can be loaded into each row of the PE array, and each row can apply the fine-grained sparse weight matrix to different FMAP inputs. The partial sums can be stored and applied to the next execution cycle. At the next execution cycle, the next constrained fine-grained sparse weight matrix can be loaded into each row of the PE array, and the FMAP input data from the previous execution cycle can be reloaded into the PE array, and so on. This scenario can be used where the results of applying different FMAP input data to the same weight matrix are summed together. Executing the matrix multiplication operation in this manner can increase the computational performance by fully utilizing the PE array.

In some implementations, the set of sparse matrix multiplication operations may include concurrently performing multiple sparse matrix multiplications using multiple rows of the array of processing elements to multiply the same set of feature map inputs with different constrained fine-grained sparse weight matrices. An example of an integrated circuit device executing such instructions is shown in PE array 550 of FIG. 5. In such a scenario, the set of constrained fine-grained sparse weight matrices converted from the original weight matrix is loaded together into the PE array, and the number of rows used to execute the requested matrix multiplication operation can be minimized. This can improve power consumption by allowing the unused rows of the PE array to be turned off when performing the set of sparse matrix multiplication operations. In some implementations, the unused rows can alternatively be repurposed to perform other computation if suitable for the neural network model.

In some implementations, the set of sparse matrix multiplication operations may include concurrently performing multiple sparse matrix multiplications using multiple rows of the array of processing elements to multiply different sets of feature map inputs with different constrained fine-grained sparse weight matrices, respectively. An example of an integrated circuit device executing such instructions is shown in PE array 650 of FIG. 6. In such a scenario, the constrained fine-grained sparse weight matrices converted from the original weight matrix are loaded together into the PE array, and the number of rows used to execute the requested matrix multiplication operation can be minimized. This scenario differs from PE array 550 in that each row of PE array 650 applies a different set of FMAP input data. As explained with reference to FIG. 6 above, this scenario can be used to efficiently perform a matrix multiplication operation of a weight matrix that is larger than the array size of the hardware. This scenario can also improve power consumption by allowing the unused rows of the PE array to be turned off when performing the set of sparse matrix multiplication operations. In some implementations, the unused rows can alternatively be repurposed to perform other computation if suitable for the neural network model.

In other implementations, the set of sparse matrix multiplication operations can incorporate different combinations of the above techniques to take advantage of the hardware executing the instructions. By using a hardware architecture having multiple FMAP input data buses for each processing element such as those describe above, instructions for executing a neural network can be tailored to reduce power consumption, improve array utilization, or a combination of both. The technique disclosed herein can also improve memory usage by reducing the storage footprint of the weight matrix.

Figure 12:
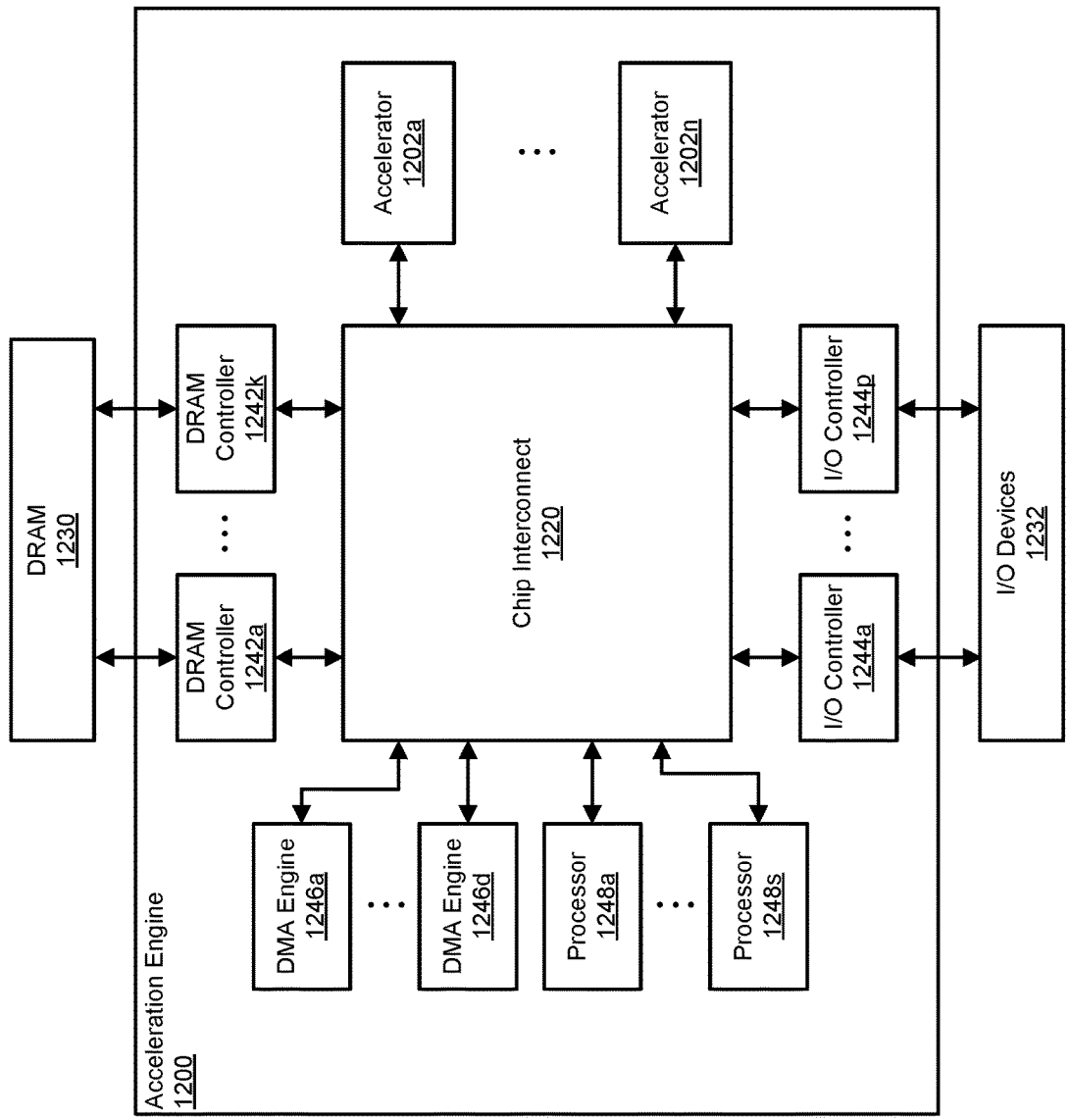
FIG. 12 illustrates a block diagram of an example of an acceleration engine.

FIG. 12 includes a block diagram that illustrates an example of an acceleration engine 1200. The acceleration engine 1200 is an example of an integrated circuit that can include one or more accelerators 1202a-1202n that may be similar to the accelerator illustrated in FIG. 2.

In the example of FIG. 12, the acceleration engine 1200 includes multiple accelerators 1202a-1202n, each of which can perform a set of operations. In various examples, the accelerators 1202a-1202n are for particular types of operations, so that the accelerators 1202a-1202n can perform the operations much faster than when similar operations are performed by a general purpose processor. In various examples, to perform a set of operations, input data on which the operations are to be performed must first be moved into the accelerators 1202a-1202n. Additionally, in some cases, program code is also moved into the accelerators 1202a-1202n, which programs the operations that the accelerators 1202a-1202n will perform on the data. In the illustrated example, the acceleration engine 1200 includes n accelerators 1202a-1202n. Examples of accelerators that can be included in the acceleration engine 1200 include graphics accelerators, floating point accelerators, neural network accelerators, and others. In various examples, the accelerators 1202a-1202n can each be the same (e.g., each of the is a graphics accelerator) or can be different (e.g., the accelerators 1202a-1202n include a graphics accelerator, a floating point accelerator, and neural network accelerator).

The example acceleration engine 1200 further includes DRAM controllers 1242a-1242k for communicating with an external memory. The external memory is implemented, in this example, using DRAM 1230. In the illustrated example, the acceleration engine 1200 includes k DRAM controllers 1242a-1242k, each of which may be able to communicate with an independent set of banks of DRAM. In other examples, other types of RAM technology can be used for the external memory. The DRAM controllers 1242a-1242k can also be referred to as memory controllers.

In various examples, input data and/or program code for the accelerators 1202a-1202n can be stored in the DRAM 1230. Different programs can cause the accelerators 1202a-1202n to perform different operations. For example, when one of the accelerators is a neural network accelerator, one program can configure the neural network accelerator to perform speech recognition while another program can configure the neural network accelerator to perform image recognition. In various examples, different accelerators 1202a-1202n can be programmed with different programs, so that each performs a different set of operations. In various examples, the processors 1249a-1249s can manage moving of program code from the DRAM 1230 to the accelerators 1202a-1202n.

The example acceleration engine 1200 further includes I/O controllers 1244a-1244p for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244p can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244a-1244p, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1249a-1249s, which can also be referred to as data management processors. In the example of FIG. 12, the acceleration engine 1200 includes s processors 1249a-1249s incorporated into the device (e.g., on the same silicon die). In other examples, the processors 1249a-1249s can be external to the acceleration engine 1200 (e.g., on a different die and/or in a different package). In some examples, the processors 1249a-1249s can manage the movement of data from I/O devices 1232 to the accelerators 1202a-1202n or the DRAM 1230. For example, input data may be located at an I/O device 1232 or in processor memory, and the processors 1249a-1249s can move the input from the I/O device 1232 or processor memory into an accelerator or into DRAM 1230. As another example, program code for the accelerators 1202a-1202n may be located on an I/O device 1232 or in processor memory.

The example acceleration engine 1200 further includes DMA engines 1246a-1246d that can move data between the accelerators 1202a-1202n, DRAM controllers 1242a-1242k, and I/O controllers 1244a-1244p. In the illustrated example, the acceleration engine 1200 includes d DMA engines 1246a-1246d. In some implementations, the DMA engines 1246a-1246d can be assigned to specific tasks, such as moving data from the DRAM controllers 1242a-1242d to the accelerators 1202a-1202n, or moving data between the I/O controllers 1244a-1244p and the accelerators 1202a-1202n. These tasks can be assigned, for example, by enqueueing descriptors with the DMA engines 1246a-1246d, where a descriptor identifies an address for a block of data and an operation (e.g., a read or a write) to perform. A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1249a-1249s can be responsible for managing the data movement for a different accelerator. In some examples, a processor may manage the data movement for more than one accelerator. Similarly, in various examples, each of the processors 1249a-1249s can be assigned to one or more DMA engines 1246a-1246d. In these and other examples, associations between processors 1249a-1249s, accelerators 1202a-1202n, and DMA engines 1246a-1246d are determined by program code being executed by each respective processor.

In the example acceleration engine 1200, the various components can communicate over a chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
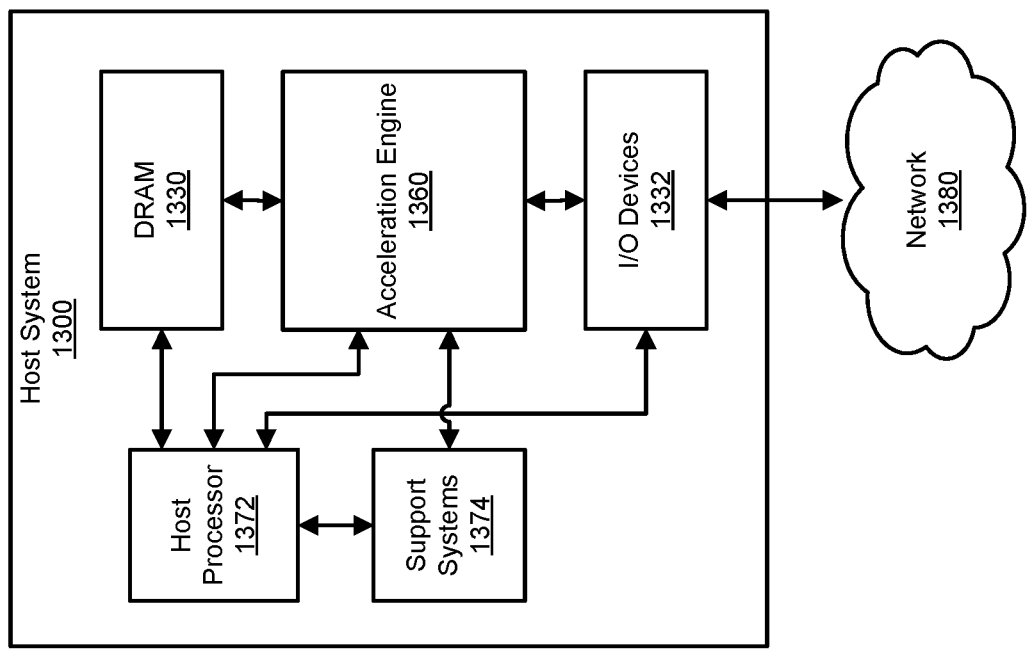
FIG. 13 illustrates a block diagram of an example of a host system.

FIG. 13 includes a block diagram that illustrates an example of a host system 1300 in which an acceleration engine 1360 can be used. The acceleration engine 1360 of FIG. 13 is an example of a device that can include one or more accelerators such as is illustrated in FIG. 10. The example host system 1300 of FIG. 13 includes the acceleration engine 1360, a host processor 1392, DRAM 1330 or processor memory, I/O devices 1332, and support systems 1394. In various implementations, the host system 1300 can include other hardware that is not illustrated here.

The host processor 1392 is a general purpose integrated circuit that is capable of executing program instructions. In some examples, the host processor 1392 can include multiple processing cores. A multi-core processor may include multiple processing units within the same processor. In some examples, the host system 1300 can include more than one host processor 1392. In some examples, the host processor 1392 and the acceleration engine 1360 can be one chip, such as, one or more integrated circuits within the same package.

In various examples, the host processor 1392 can communicate with other components in the host system 1300 over one or more communication channels. For example, the host system 1300 can include a host processor bus, which the host processor 1392 can use to communicate with the DRAM 1330, for example. As another example, the host system 1300 can include an I/O bus, such as a PCI-based bus, over which the host processor 1392 can communicate with the acceleration engine 1360 and/or the I/O devices 1332, for example. In various examples, the host system 1300 can, alternatively or additionally, include other communication channels or busses, such as serial busses, power management busses, storage device busses, and so on.

In some examples, software programs executing on the host processor 1392 can receive or generate input for processing by the acceleration engine 1360. In some examples, the programs can select an appropriate neural network to execute for a given input. For example, a program may be for language translation, and can select one or more neural networks capable of speech recognition and/or machine translation. In these and other examples, the programs can configure the acceleration engine 1360 with the neural network to execute, and/or can select a neural network processing engine on the acceleration engine 1360 that has previously been configured to execute the desired neural network. In some examples, once the acceleration engine 1360 has started an inference on input data, the host processor 1392 can manage the movement of data (such as weights, instructions, intermediate results, results of conditional layers, and/or final results) into or out of the acceleration engine 1360.

In some examples, a software program that is using the acceleration engine 1360 to conduct an inference can read the result from a conditional layer from the acceleration engine 1360 and/or from a storage location, such as in DRAM 1330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1330 is memory that is used by the host processor 1392 for storage of program code that the host processor 1392 is in the process of executing, as well as values that are being operated on. In some examples, the data for a neural network (e.g., weight values, instructions, and other data) can be all or partially stored in the DRAM 1330. DRAM is a common term for processor memory, and though DRAM is volatile memory, processor memory can be volatile and/or non-volatile. Though not illustrated here, the host system 1300 can include other volatile and non-volatile memories for other purposes. For example, the host system 1300 can include a Read-Only Memory (ROM) that stores boot code for booting the host system 1300 at power on, and/or Basic Input/Output System (BIOS) code.

Though not illustrated here, the DRAM 1330 can store instructions for various programs, which can be loaded into and be executed by the host processor 1392. For example, the DRAM 1330 can be storing instructions for an operating system, one or more data stores, one or more application programs, one or more drivers, and/or services for implementing the features disclosed herein.

The operating system can manage and orchestrate the overall operation of the host system 1300, such as scheduling tasks, executing applications, and/or controller peripheral devices, among other operations. In some examples, a host system 1300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1300. For example, some drivers can provide communication between the operating system and peripheral devices or I/O devices 1332. Alternatively or additionally, some drivers may provide communication between application programs and the operating system, and/or application programs and peripheral devices accessible to the host system 1300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1332 can include hardware for connecting to user input and output devices, such as keyboards, mice, pens, tablets, voice input devices, touch input devices, displays or monitors, speakers, and printers, among other devices. The I/O devices 1332 can also include storage drives and/or network interfaces for connecting to a network 1390. For example, the host system 1300 can use a network interface to communicate with storage devices, user terminals, other computing devices or servers, and/or other networks, among various examples.

In various examples, one or more of the I/O devices 1332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1300 or may be in an external enclosure. A storage device can be fixed (e.g., attached by screws) or removable (e.g., having a physical release mechanism and possibly a hot-plug mechanism).

Storage devices, the DRAM 1330, and any other memory component in the host system 1300 are examples of computer-readable storage media. Computer-readable storage media are physical mediums that are capable of storing data in a format that can be read by a device such as the host processor 1392. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1332 can be PCI-based devices. In these examples, a PCI-based I/O device includes a PCI interface for communicating with the host system 1300. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1394 can include hardware for coordinating the operations of the acceleration engine 1360. For example, the support systems 1394 can include a microprocessor that coordinates the activities of the acceleration engine 1360, including moving data around on the acceleration engine 1360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1392. In some examples, the program executed by the microprocessor is stored on the hardware of microprocessor, or on a non-volatile memory chip in the host system 1300. In some examples, the microprocessor and the acceleration engine 1360 can be on chip, such as one integrated circuit on the same die and in the same package.

In some examples, the support systems 1394 can be responsible for taking instructions from the host processor 1392 when programs executing on the host processor 1392 request the execution of a neural network. For example, the host processor 1392 can provide the support systems 1394 with a set of input data and a task that is to be performed on the set of input data. In this example, the support systems 1394 can identify a neural network that can perform the task, and can program the acceleration engine 1360 to execute the neural network on the set of input data. In some examples, the support systems 1394 only needs to select an appropriate neural network processing engine of the neural network processor. In some examples, the support systems 1394 may need to load the data for the neural network onto the acceleration engine 1360 before the acceleration engine 1360 can start executing the neural network. In these and other examples, the support systems 1394 can further receive the output of executing the neural network, and provide the output back to the host processor 1392.

In some examples, the operations of the support systems 1394 can be handled by the host processor 1392. In these examples, the support systems 1394 may not be needed and can be omitted from the host system 1300.

In various examples, the host system 1300 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A neural network processor comprising:
a memory operable to store a constrained fine-grained sparse matrix as a set of non-zero values and metadata associated with each non-zero value indicating which row in the constrained fine-grained sparse matrix that the non-zero value corresponds to; and an array of processing elements arranged in rows and columns, wherein each row of processing elements has a plurality of row input buses, wherein the array of processing elements is operable in a sparsity mode of operation and a normal mode of operation, and wherein the array of processing elements is operable to perform a sparse matrix multiplication operation on the constrained fine-grained sparse matrix by:

loading the set of non-zero values into a row of the array of processing elements; and for each processing element in the row of the array of processing elements:

selecting an input element from the plurality of row input buses based on the metadata associated with the non-zero value loaded into the processing element;

multiplying the selected input element with the non-zero value loaded into the processing element to generate a multiplication result;

adding the multiplication result to a column input to generate a partial sum; and outputting the partial sum to a column output.

2. The neural network processor of claim 1, wherein the array of processing elements is operable to concurrently perform multiple sparse matrix multiplication operations using multiple rows of the array of processing elements.

3. The neural network processor of claim 1, wherein the array of processing elements is operable to turn off unused rows of the array of processing elements while performing the sparse matrix multiplication operation.

4. The neural network processor of claim 1, wherein the array of processing elements is operable to perform a matrix multiplication operation on a dense matrix using every row of the array of processing elements.

5. An integrated circuit device comprising:

an array of processing elements arranged in rows and columns, wherein each processing element includes:

a register configured to store a value;

a multiplexor configured to select, based on metadata associated with the value stored in the register, an input element from a plurality of input data buses;

a multiplier configured to multiply the selected input element with the value stored in the register to generate a multiplication result; and an adder configured to add the multiplication result to a partial sum input to generate a partial sum output, wherein the array of processing elements is operable in a sparsity mode of operation and a normal mode of operation.

6. The integrated circuit device of claim 5, wherein in the sparsity mode of operation, each row of the array of processing elements is operable to perform a sparse matrix multiplication operation on a two-dimensional sparse matrix.

7. The integrated circuit device of claim 5, wherein in the sparsity mode of operation, the metadata associated with the value stored in the register includes sparsity row information to indicate which row of a two-dimensional sparse matrix that the value corresponds to, and the multiplexor is configured to select the input element based on the sparsity row information.

8. The integrated circuit device of claim 7, wherein the sparsity row information is encoded using one-hot encoding.

9. The integrated circuit device of claim 7, wherein the sparsity row information is represented as a row number.

10. The integrated circuit device of claim 5, wherein in the normal mode of operation, the array of processing elements is operable to perform a matrix multiplication operation on a matrix using multiple rows of the array of processing elements.

11. The integrated circuit device of claim 5, wherein in a normal mode of operation, the multiplexor is configured to select the input element on a predetermined input data bus.

12. The integrated circuit device of claim 5, wherein the metadata includes mode information to control whether the array of processing elements is operating in the sparsity mode of operation or in the normal mode of operation.

13. A method for operating an acceleration circuit having an array of processing elements arranged in rows and columns to perform a matrix multiplication operation, the method comprising:

receiving, by a processing element in the array of processing elements, a value for storing in a register;

storing, by the processing element, the value in the register;

receiving, by the processing element, a set of input elements on respective input data buses;

selecting, by a multiplexer of the processing element, an input element from the input data buses based on metadata associated with the value stored in the register;

multiplying, by a multiplier of the processing element, the selected input element with the value stored in the register to generate a multiplication result; and adding, by an adder of the processing element, the multiplication result to a partial sum input to generate a partial sum output, wherein the array of processing elements is operable in a sparsity mode of operations and a normal mode of operation.

14. The method of claim 13, wherein the value stored in the register is a non-zero value of a sparse matrix loaded from a memory that stores the sparse matrix as a set of non-zero values.

15. The method of claim 14, wherein the memory further stores sparsity row information associated with each non-zero value, the sparsity row information indicating which row in the sparse matrix that the non-zero value corresponds to.

16. The method of claim 15, wherein the sparsity row information is represented using one-hot encoding or using a row number.

17. The method of claim 13, wherein the matrix multiplication operation is a sparse matrix multiplication operation being performed on a sparse matrix, and the sparse matrix multiplication operation is performed using one row of the array of processing elements.

18. The method of claim 17, further comprising:

turning off unused rows of the array of processing elements while performing the sparse matrix multiplication operation.

19. The method of claim 17, further comprising:

performing another sparse matrix multiplication operation on another sparse matrix using another row of the array of processing elements concurrently with the sparse matrix multiplication operation.

20. The method of claim 17, further comprising:

performing another matrix multiplication operation using every row of the array of processing elements.

* * * * *